(12) United States Patent
Evers, Jr.

(10) Patent No.: US 11,858,221 B2
(45) Date of Patent: Jan. 2, 2024

(54) MULTILAYER ASSEMBLIES WITH SURFACE DEPRESSIONS AND METHODS OF PRODUCING AND USING THEM

(71) Applicant: Peter Thomas Evers, Jr., Forest, VA (US)

(72) Inventor: Peter Thomas Evers, Jr., Forest, VA (US)

(73) Assignee: Hanwha Azdel, Inc., Forest, VA (US)

( * ) Notice: Subject to any disclaimer, the term of this patent is extended or adjusted under 35 U.S.C. 154(b) by 13 days.

(21) Appl. No.: 17/496,871

(22) Filed: Oct. 8, 2021

(65) Prior Publication Data
US 2022/0274349 A1 Sep. 1, 2022

Related U.S. Application Data

(60) Provisional application No. 63/090,066, filed on Oct. 9, 2020.

(51) Int. Cl.
| | |
|---|---|
| B29C 65/56 | (2006.01) |
| B29C 65/48 | (2006.01) |
| B29L 9/00 | (2006.01) |
| B29L 31/60 | (2006.01) |

(52) U.S. Cl.
CPC .......... *B29C 65/565* (2013.01); *B29C 65/48* (2013.01); *B29L 2009/00* (2013.01); *B29L 2031/608* (2013.01)

(58) Field of Classification Search
CPC ... B29C 65/48; B29C 65/486; B29L 2009/00; B29L 2031/608; B32B 2255/10; B32B 2255/26; B32B 2262/0269; B32B 2262/10; B32B 2262/101; B32B 2262/103; B32B 2262/106; B32B 2605/00; B32B 27/08; B32B 27/10; B32B 27/20; B32B 27/281; B32B 27/283; B32B 27/285; B32B 27/286; B32B 27/288; B32B 27/302; B32B 27/304; B32B 27/32; B32B 27/34; B32B 27/36; B32B 27/365; B32B 29/00; B32B 3/12; B32B 3/30; B32B 5/18
USPC ........ 156/60, 196, 198, 212, 219, 220, 221, 156/222, 308.2, 309.6; 428/116, 118,
(Continued)

(56) References Cited

U.S. PATENT DOCUMENTS

| | | | | |
|---|---|---|---|---|
| 3,825,642 A | * | 7/1974 | Kies .......................... | B27N 3/06 156/212 |
| 4,084,996 A | * | 4/1978 | Wheeler ................. | B32B 21/06 144/368 |

(Continued)

FOREIGN PATENT DOCUMENTS

| | | | | |
|---|---|---|---|---|
| DE | 102012006609 A1 | * | 10/2013 | ........... B29C 43/206 |
| EP | 1177890 A1 | * | 2/2002 | ................ B32B 3/30 |
| FR | 2203273 A | * | 6/1974 | ............. B29C 44/14 |

(Continued)

*Primary Examiner* — Philip C Tucker
*Assistant Examiner* — Brian R Slawski
(74) *Attorney, Agent, or Firm* — Rhodes IP PLC; Christopher Rhodes

(57) ABSTRACT

Certain configurations of multilayer assemblies are described. In certain embodiments, the multilayer assembly can include a core layer, a skin layer and one or more depressions in a surface of the multilayer assembly. In other configurations, the multilayer assembly can include a core layer, a skin layer, one or more depressions in a surface of the multilayer assembly and one or more additional layers.

20 Claims, 15 Drawing Sheets

(58) Field of Classification Search
USPC ......... 428/156, 158, 161, 162, 304.4, 317.1, 428/317.3, 317.9
See application file for complete search history.

(56) References Cited

U.S. PATENT DOCUMENTS

| 4,379,192 | A  | * | 4/1983  | Wahlquist | ............... | B32B 27/30 |
| | | | | | | 128/853 |
| 2010/0291348 | A1 | * | 11/2010 | Morrison  | ................ | C04B 35/80 |
| | | | | | | 156/219 |

FOREIGN PATENT DOCUMENTS

| FR | 2975043 A1 | * | 11/2012 | ........... | B29C 53/063 |
| WO | WO-2015178141 A1 | * | 11/2015 | ........... | B29C 43/021 |

* cited by examiner

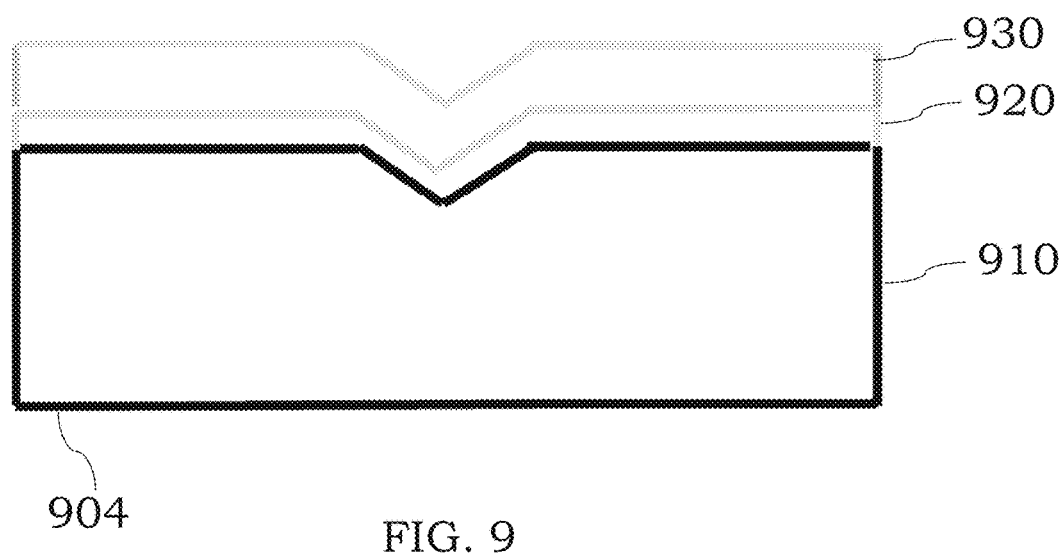
FIG. 9
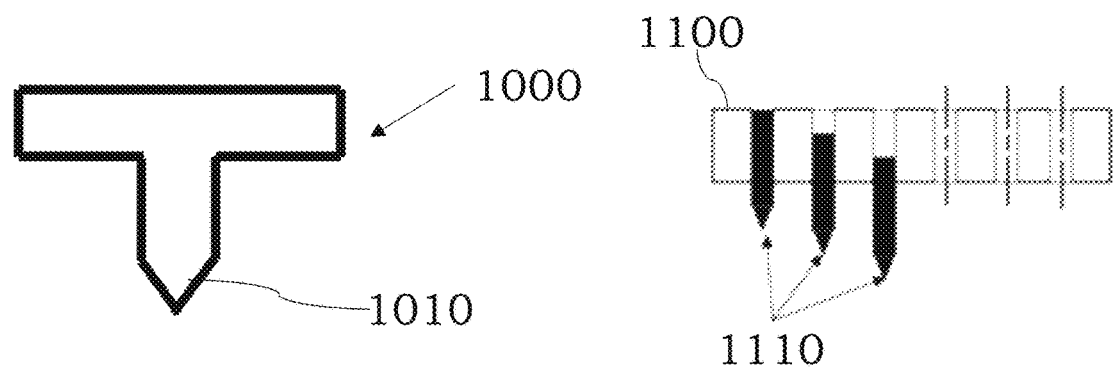
FIG. 10
FIG. 11

MULTILAYER ASSEMBLIES WITH SURFACE DEPRESSIONS AND METHODS OF PRODUCING AND USING THEM

PRIORITY APPLICATION

This application is related to, and claims priority to and the benefit of, U.S. Application No. 63/090,066 filed on Oct. 9, 2020, the entire disclosure of which is hereby incorporated herein by reference for all purposes.

TECHNOLOGICAL FIELD

Certain configurations described herein are directed to multilayer assemblies comprising one or more depressions in a surface. More particularly, certain configurations are directed to multilayer assemblies including a skin layer and a core layer where depressions in the skin layer and core layer can enhance bonding of the skin layer to the core layer.

BACKGROUND

Multilayer assemblies can include two or more layers. The materials in the different layers can be arranged in different ways.

SUMMARY

In an aspect, a method comprises disposing a first porous fiber reinforced thermoplastic layer on a first surface of a core layer to form a multilayer assembly, wherein the first porous fiber reinforced thermoplastic layer comprises a web of open celled structures formed by a plurality of reinforcing materials held together with a thermoplastic material. In some configurations, the method comprises applying a first stimulus to a first surface of the multilayer assembly to provide a plurality of first depressions in the core layer and across the first surface of the multilayer assembly, wherein the applied first stimulus forces the first porous fiber reinforced thermoplastic layer into the plurality of first depressions in the core layer to enhance bonding between the first porous fiber reinforced thermoplastic layer and the core layer.

In certain embodiments, the method includes applying the first stimulus to the first surface of the multilayer assembly by placing the multilayer assembly in a mold comprising a plurality of surface projections and molding the multilayer assembly using the mold. In other embodiments, the method includes applying the first stimulus to the first surface of the multilayer assembly by pressing a plate comprising a plurality of surface projections into the first surface of the multilayer assembly. In some examples, the method includes applying the first stimulus to the first surface of the multilayer assembly using a plurality of fluid jets positioned adjacent to the first surface of the multilayer assembly.

In certain embodiments, the provided plurality of first depressions have different geometries.

In other embodiments, the method comprises applying a second stimulus to a second surface of the multilayer assembly to provide a plurality of second depressions in the core layer and across the second surface of the multilayer assembly, wherein the applied second stimulus forces the core layer into the first porous fiber reinforced thermoplastic layer to enhance bonding between the first porous fiber reinforced thermoplastic layer and the core layer. In some examples, the method comprises applying the first stimulus to the first surface of the multilayer assembly and applying the second stimulus to the second surface of the disposed multilayer assembly by placing the multilayer assembly in a mold comprising a plurality of surface projections and molding the multilayer assembly using the mold. In other embodiments, the method comprises applying the second stimulus to the second surface of the multilayer assembly by pressing a plate comprising a plurality of surface projections into the second surface of the multilayer assembly. In some examples, the method comprises applying the second stimulus to the second surface of the multilayer assembly using a plurality of fluid jets positioned adjacent to the second surface of the multilayer assembly. In other examples, the provided plurality of second depressions have different geometries.

In some configurations, the plurality of first depressions have different depths.

In other embodiments, the method comprises disposing a first skin layer on the disposed first porous fiber reinforced thermoplastic layer prior to applying the first stimulus.

In some examples, the first porous fiber reinforced thermoplastic layer comprises an adhesive film.

In other examples, the method comprises disposing a first skin layer on the multilayer assembly after applying the first stimulus.

In some examples, the core layer comprises a porous core layer and the first porous fiber reinforced thermoplastic layer comprises reinforcing fibers and a polyolefin thermoplastic material. In other embodiments, the core layer comprises a honeycomb core layer.

In some embodiments, the reinforcing fibers comprise one or more of glass fibers, aramid fibers, graphite fibers, carbon fibers, inorganic mineral fibers, metal fibers, metalized synthetic fibers, and metallized inorganic fibers, fibers and combinations thereof.

In other embodiments, the thermoplastic material comprises one or more of polyethylene, polypropylene, polystyrene, acrylonitrylstyrene, butadiene, polyethyleneterephthalate, polybutyleneterephthalate, polybutylenetetrachlorate, polyvinyl chloride, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, a poly(1,4 phenylene) compound, a high heat polycarbonate, high temperature nylon, silicones, or blends of these materials with each other.

In certain instances, the honeycomb core layer is a paper honeycomb core layer, the reinforcing fibers comprise glass fibers and the thermoplastic material comprises a polyolefin.

In other embodiments, the method comprises disposing a second porous fiber reinforced thermoplastic layer on a second surface of the core layer to form the multilayer assembly, wherein the second porous fiber reinforced thermoplastic layer comprises a web of open celled structures formed by a plurality of reinforcing materials held together with a thermoplastic material, and applying a second stimulus to the second surface of the multilayer assembly to provide a plurality of second depressions in the core layer and across the second surface of the multilayer assembly, wherein the applied second stimulus forces the second porous fiber reinforced thermoplastic layer into the plurality of second depressions in the core layer to enhance bonding between the second porous fiber reinforced thermoplastic layer and the core layer In certain embodiments, the method comprises applying the second stimulus to the second surface of the multilayer assembly by placing the multilayer assembly in a mold comprising a plurality of surface projections and molding the multilayer assembly using the mold.

In some embodiments, the method comprises applying the second stimulus to the second surface of the multilayer assembly by pressing a plate comprising a plurality of surface projections into the second surface of the multilayer assembly.

In other embodiments, the method comprises applying the second stimulus to the second surface of the multilayer assembly using a plurality of fluid jets positioned adjacent to the second surface of the multilayer assembly.

In certain examples, the plurality of first depressions are vertically offset from the plurality of second depressions. In other examples, the plurality of first depressions have a different depth than the plurality of second depressions.

In certain embodiments, the method comprises disposing a first skin layer on the disposed first porous fiber reinforced thermoplastic layer prior to applying the first stimulus and disposing a second skin layer on the disposed first porous fiber reinforced thermoplastic layer prior to applying the second stimulus.

In certain examples, the method comprises simultaneously applying the first stimulus to the disposed first skin layer and applying the second stimulus to the disposed second skin layer by placing the multilayer assembly in a mold comprising a plurality of surface projections and molding the multilayer assembly using the mold.

In other examples, the method comprises applying the first stimulus to the disposed first skin layer of the multilayer assembly by pressing a first plate comprising a plurality of surface projections into the disposed first skin layer and applying the second stimulus to the disposed second skin layer by pressing a second plate comprising a plurality of surface projections into the disposed second skin layer.

In some examples, the method comprises applying the first stimulus to the disposed first skin layer using a plurality of air jets positioned adjacent to the disposed first skin layer and applying the second stimulus to the disposed second skin layer using a plurality of air jets positioned adjacent to the disposed second skin layer.

In certain embodiments, the method comprises disposing a first skin layer on the multilayer assembly after applying the first stimulus and the second stimulus.

In another aspect, a multilayer assembly comprises a core layer comprising a plurality of depressions across a first surface of the core layer; and a first porous fiber reinforced thermoplastic layer disposed on the first surface of core layer, the first porous fiber reinforced thermoplastic layer comprising a web of open celled structures formed by a plurality of reinforcing materials held together with a thermoplastic material, wherein the first porous fiber reinforced thermoplastic layer is bonded to surfaces of the plurality of depressions across the first surface of the core layer.

In an additional aspect, a multi layer assembly comprises a core layer comprising a plurality of depressions across a first surface of the core layer. In certain embodiments, the assembly comprises a first porous fiber reinforced thermoplastic layer disposed on the first surface of core layer, the first porous fiber reinforced thermoplastic layer comprising a web of open celled structures formed by a plurality of reinforcing materials held together with a thermoplastic material, wherein the first porous fiber reinforced thermoplastic layer is bonded to surfaces of the plurality of depressions across the first surface of the core layer. In other embodiments, the assembly comprises a second porous fiber reinforced thermoplastic layer disposed on a second surface of core layer, the second porous fiber reinforced thermoplastic layer comprising a web of open celled structures formed by a plurality of reinforcing materials held together with a thermoplastic material.

In another aspect, a multilayer assembly comprises a core layer comprising a plurality of first depressions across a first surface of the core layer and a plurality of second depressions across a second surface of the core layer. In certain embodiments, the assembly comprises a first porous fiber reinforced thermoplastic layer disposed on the first surface of core layer, the first porous fiber reinforced thermoplastic layer comprising a web of open celled structures formed by a plurality of reinforcing materials held together with a thermoplastic material, wherein the first porous fiber reinforced thermoplastic layer is bonded to surfaces of the plurality of first depressions across the first surface of the core layer. In other embodiments, the assembly comprises a second porous fiber reinforced thermoplastic layer disposed on a second surface of core layer, the second porous fiber reinforced thermoplastic layer comprising a web of open celled structures formed by a plurality of reinforcing materials held together with a thermoplastic material, wherein the second porous fiber reinforced thermoplastic layer is bonded to surfaces of the plurality of second depressions across the second surface of the core layer.

In an additional aspect, a bulk head wall configured to separate a passenger compartment of a vehicle from a cargo compartment of the vehicle, the bulk head wall comprises a core layer and a first porous fiber reinforced thermoplastic layer disposed on the first surface of core layer, wherein the first porous fiber reinforced thermoplastic layer is bonded to surfaces of a plurality of first depressions across a first surface of the core layer.

In another aspect, a vehicle load floor configured to be placed at a rear section of a vehicle and support at least 50 pounds is described. In certain examples, the vehicle load floor comprises a core layer and a first porous fiber reinforced thermoplastic layer disposed on the first surface of core layer, wherein the first porous fiber reinforced thermoplastic layer is bonded to surfaces of a plurality of first depressions across a first surface of the core layer.

In an additional aspect, a vehicle comprising an engine compartment and a passenger compartment is described. In some examples, the passenger compartment comprises a load floor at a rear section of the vehicle that is configured to support at least 50 pounds. In some examples, the load floor comprises a core layer and a first porous fiber reinforced thermoplastic layer disposed on the first surface of core layer, wherein the first porous fiber reinforced thermoplastic layer is bonded to surfaces of a plurality of first depressions across a first surface of the core layer.

Additional aspect, examples and illustrations are described.

BRIEF DESCRIPTION OF THE SEVERAL VIEWS OF THE FIGURES

Certain features, elements, attributes, configurations and embodiments of multilayer assemblies are described in which:

FIG. 9 is an illustration showing an intervening layer between a core layer and a skin layer, in accordance with certain embodiments;

FIG. 10 is an illustration showing a spike that can be used to provide a depression, in accordance with some examples.

FIG. 11 is an illustration showing a plate with adjustable spikes, in accordance with certain embodiments.

It will be recognized by the person having ordinary skill in the art, given the benefit of this disclosure, that the dimensions of the various layers in the figures are not shown to scale. No particular layer thickness or dimensions are intended or implied unless made clear from the specific description in connection with that particular layer or other component. The exact dimensions will vary depending on the final configuration of the article and/or its intended use.

DETAILED DESCRIPTION

Certain features of multilayer assemblies with one or more surface depressions across a surface of the multi layer assembly are described. In some instances, the multilayer assembly may include a core layer and one or more additional layers disposed on a surface of the core layer. The surface depressions may be present on one or more surfaces of the core layer and any additional layer disposed on the core layer. For example, a surface depression can be formed by pushing the additional layer into the core layer so the recessed area or depression includes the additional layer. As noted in more detail below, pressing of the additional layer into the core layer can increase bonding and/or peel strength of the additional layer to the core layer. This increased bonding may result in less likelihood of delamination or peeling of the additional layer from the core layer. If desired, surface depressions may exist on two or more surfaces of the multilayer assembly. Different surface depressions need not have the same shape, width or depth. Further different surfaces of the multilayer assembly may have a different number of depressions, depressions of different shapes or geometries or otherwise not include the same number or type of depressions. In certain configurations, depressions may be spread out across a surface of the multilayer assembly, whereas in other instances, the depressions may be localized or present in a higher number at certain areas of the multilayer assembly, e.g., more depressions may be present at edges of the multilayer assembly to reduce peeling at the edges.

Figure 1A:
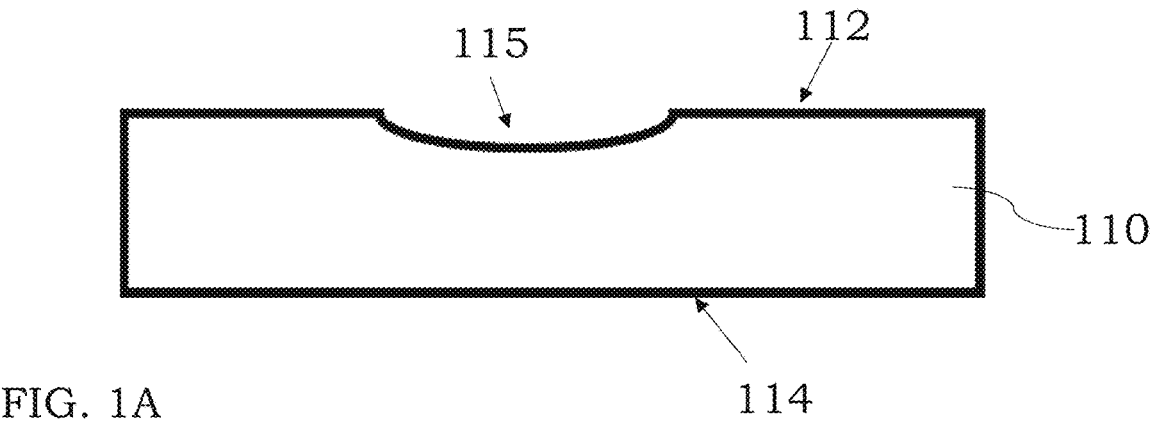
FIGS. 1A, 1B, 1C, 1D, 1E, 1F, 1G, 1H and 1I are illustrations of a core layer including one or more depressions in a surface of the core layer.

In some configurations, a core layer with one or more surface depressions is shown in FIG. 1A. The core layer 110 includes a depression 115 on a first surface 112 of the core layer 110. The exact shape, width and depth of the depression 115 may vary and illustrative shapes (when viewed in cross-section) include triangular shapes, semi-circular shapes, elliptical shapes, symmetric shapes, asymmetric shapes and other shapes. While the depression 115 is shown as being present on a first surface 112, it could instead be present on the surface 114 or a depression may be present on a surface 112 and a surface 114. In addition, the depression 115 can be positioned at many different sites along the surface 112. As noted in more detail below, a skin layer or other layer may be present on the surface 112 (and/or surface 114) and have a respective depression where some portion of the skin layer or additional layer is pressed into the depression 115.

Figure 1B:
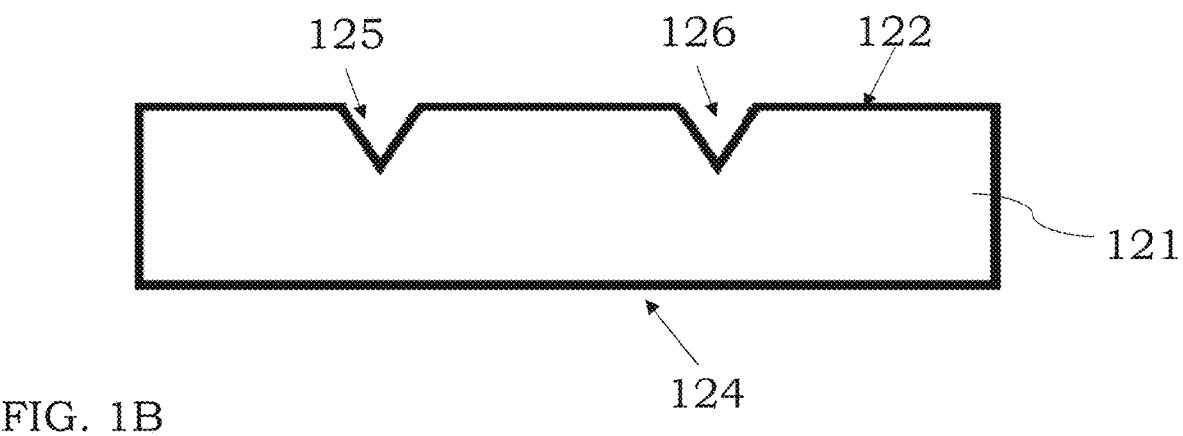
Figure 1C:
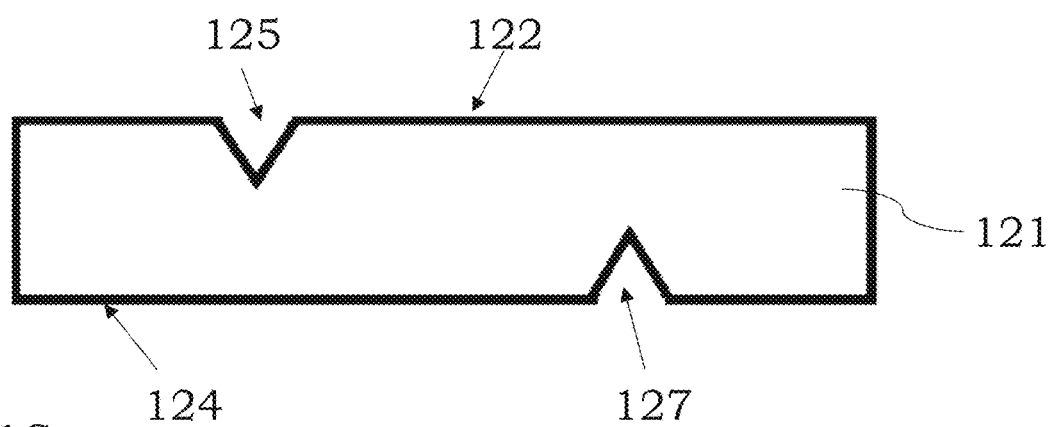

In certain embodiments, a core layer 120 is shown in FIG. 1B that comprises a first depression 125 on a first surface 122 and a second depression 126 on the first surface 122. The depressions 125, 126 need not be the same, and the exact shape, width and depth of the depressions 125, 126 each may independently vary and illustrative shapes (when viewed in cross-section) include triangular shapes, semi-circular shapes, elliptical shapes, symmetric shapes, asymmetric shapes and other shapes. In some instances, one of the depressions may instead be present on a second surface as shown in FIG. 1C, where a second depression 127 is present on a second surface 124 of the core layer 121. Where two depressions are present on different surfaces of the core layer 121, the shape, width and depth of the depressions can be the same or can be different. As noted in more detail below, a skin layer or other layer may be present on the surface 122. (and/or surface 124) and have a respective depression(s) where some portion of the skin layer or additional layer is pressed into one or both of the depressions 125, 126.

Figure 1D:
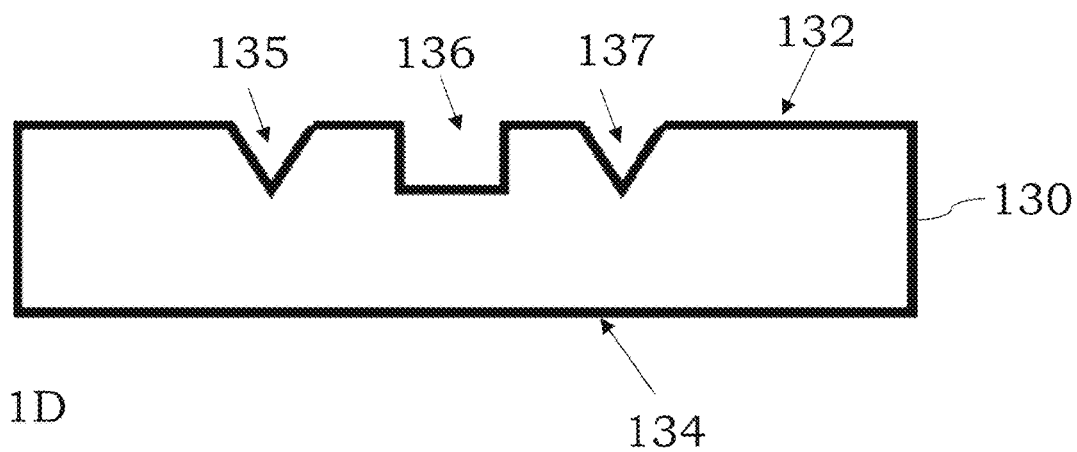
Figure 1E:
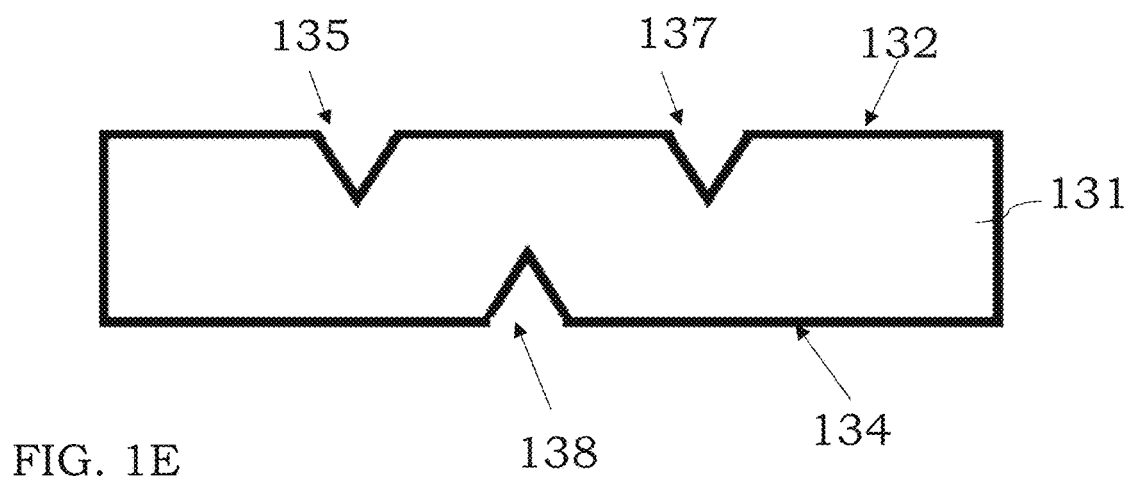

In other configurations, a core layer can include three or more depressions. Referring to FIG. 1D, a core layer 130 is shown that comprises depressions 135, 136 and 137 on a first surface 132. The depressions 135, 136, 137 need not be the same, and the exact shape, width and depth of the depressions 135, 136, 137 each may independently vary and illustrative shapes (when viewed in cross-section) include triangular shapes, semi-circular shapes, elliptical shapes, symmetric shapes, asymmetric shapes and other shapes. In some instances, one of the depressions may instead be present on a second surface as shown in FIG. 1E, where a third depression 138 is present on a second surface 134 of the core layer 131. If desired, two or more of the depressions may be present on the surface 134 of the core layer 131. Where three depressions are present on different surfaces of the core layers 130, 131, the shape, width and depth of the depressions can be the same or can be different. As noted in more detail below, a skin layer or other layer may be present on the surface 132 (and/or surface 134) and have a respective depression(s) where some portion of the skin layer or additional layer is pressed into the depressions 135, 136, 137. If desired, however, the skin layer may be pressed into fewer than all of the depressions 135, 136, 137.

Figure 1F:
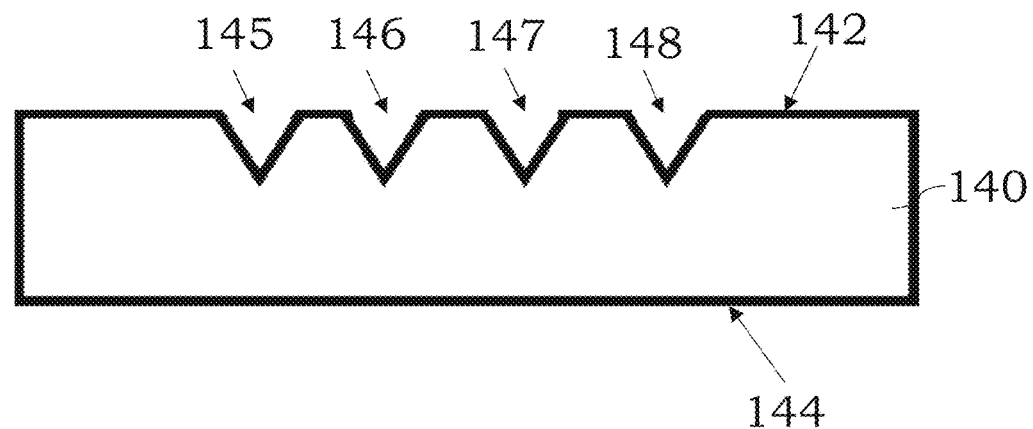
Figure 1G:
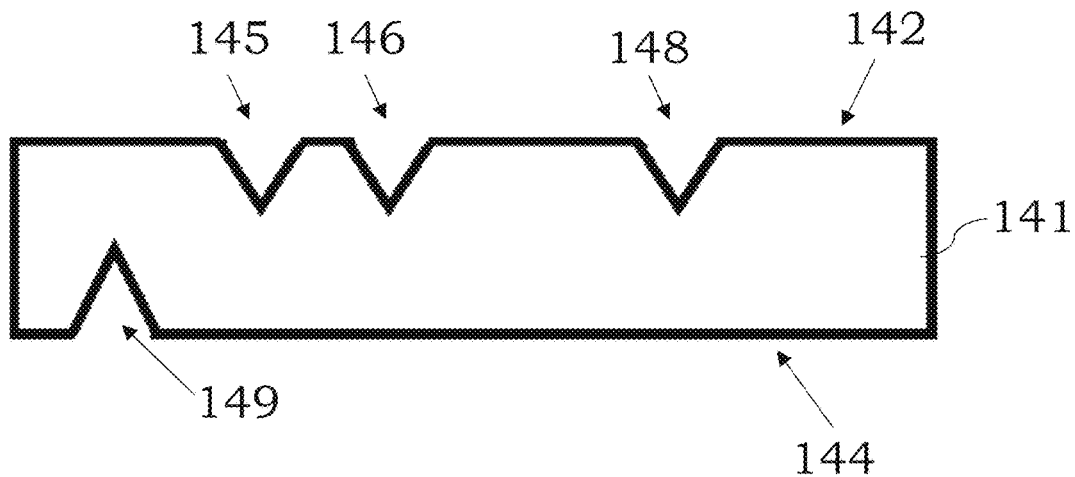

In some embodiments, a core layer can include four or more depressions. Referring to FIG. 1F, a core layer 140 is shown that comprises depressions 145, 146, 147 and 148 on a first surface 142. The depressions 145, 146, 147, 148 need not be the same, and the exact shape, width and depth of the depressions 145, 146, 147, 148 each may independently vary and illustrative shapes (when viewed in cross-section) include triangular shapes, semi-circular shapes, elliptical shapes, symmetric shapes, asymmetric shapes and other shapes. In some instances, one of the depressions may instead be present on a second surface as shown in FIG. 1G, where a fourth depression 149 is present on a second surface 144 of the core layer 141. If desired, two or more of the depressions may be present on the surface 144 of the core layer 141. Where four depressions are present on different surfaces of the core layers 140, 141, the shape, width and depth of the depressions can be the same or can be different. As noted in more detail below, a skin layer or other layer may be present on the surface 142 (and/or surface 144) and have a respective depression(s) where some portion of the skin layer or additional layer is pressed into the depressions 145, 146, 147, 148. If desired, however, the skin layer may be pressed into fewer than all of the depressions 145, 146, 147, 148.

Figure 1H:
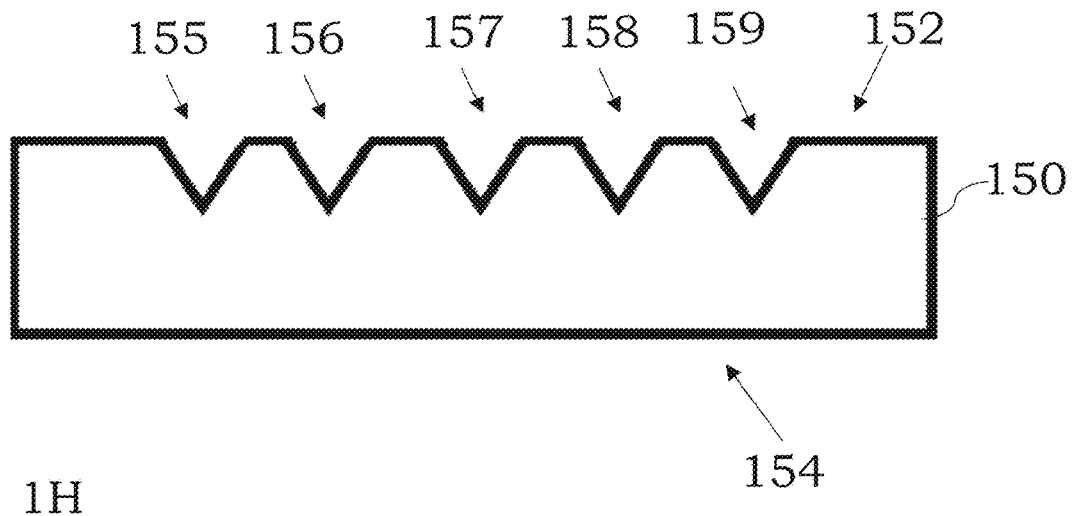
Figure 1I:
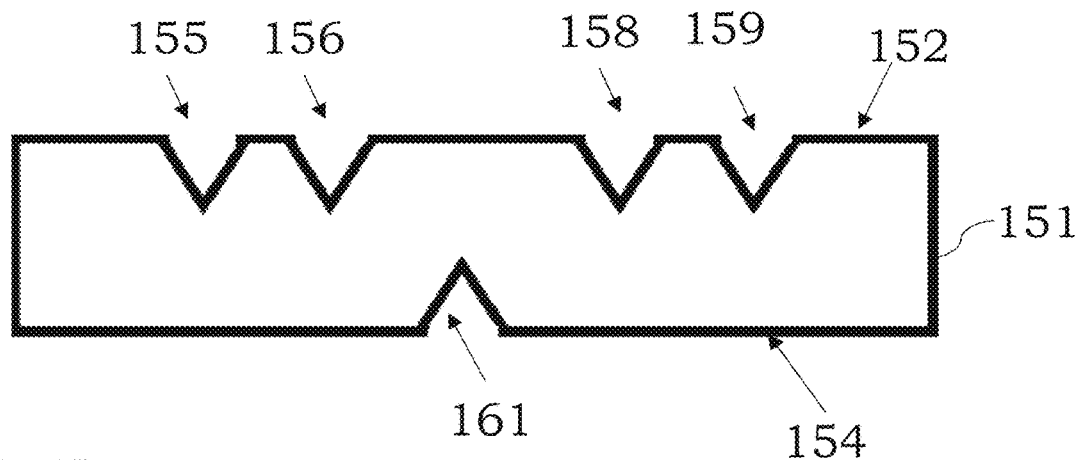

In some embodiments, a core layer can include five or more depressions. Referring to FIG. 1H, a core layer 150 is shown that comprises depressions 155, 156, 157, 158, and 159 on a first surface 152. The depressions 155, 156, 157, 158, 159 need not be the same, and the exact shape, width and depth of the depressions 155, 156, 157, 158, 159 each may independently vary and illustrative shapes (when viewed in cross-section) include triangular shapes, semi-circular shapes, elliptical shapes, symmetric shapes, asymmetric shapes and other shapes. In some instances, one of the depressions may instead be present on a second surface as shown in FIG. 1I, where a fifth depression 161 is present on a second surface 154 of the core layer 151. If desired, two or more of the depressions may be present on the surface 154 of the core layer 150. Where five depressions are present on different surfaces of the core layer 150, the shape, width and depth of the depressions can be the same or can be different. As noted in more detail below, a skin layer or other layer may be present on the surface 152 (and/or surface 154) and have a respective depressions) where some portion of the skin layer or additional layer is pressed into the depressions 155, 156, 157, 158, 159 and 160. If desired, however, the skin layer may be pressed into fewer than all of the depressions 155, 156, 157, 158, 159.

The core layers shown in FIGS. 1A-1I may each comprise a honeycomb core layer such as, for example, a paper honeycomb core layer, a polyurethane layer, an expanded foam, an extruded foam, a honeycomb structure produced from one or more polymeric materials including, but not limited to, polypropylene, polyethylene, polystyrene, a polyamide, a copolyamide, polyethylene terephthalate, a polyetherimide, a polyphenylene oxide, and other polymers, a honeycomb structure produced from one or more metals including, but not limited to, aluminum, iron, steel and other metals and metal alloys. In some embodiments, the core layer may be a honeycomb layer with a material other than cellulose. For example, the honeycomb layer may be porous and include significant open space within the core layer. The core layers shown in FIGS. 1A-1I may comprise a basis weight of about 200 grams per square meter (gsm) to about 4000 gsm. The overall thickness of the core layers shown in FIGS. 1A-1I may vary, for example, from about 0.5 cm to about 7.5 cm. The depth of the depressions shown in the core layers FIGS. 1A-1I can vary, for example, from about 0.125 inches (about 3 mm) to about 1 inch (about 2.5 cm), e.g., about 5 mm to about 1.25 mm, depending on the overall thickness of the core layer. As noted herein, different depressions can have different depths and/or geometries.

Figure 2A:
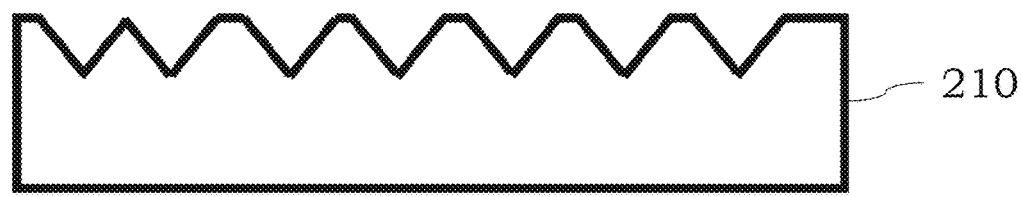
FIGS. 2A, 2B, 2C and 2D are illustrations of a core layer including a plurality of depressions in a surface.
Figure 2B:
Figure 2C:
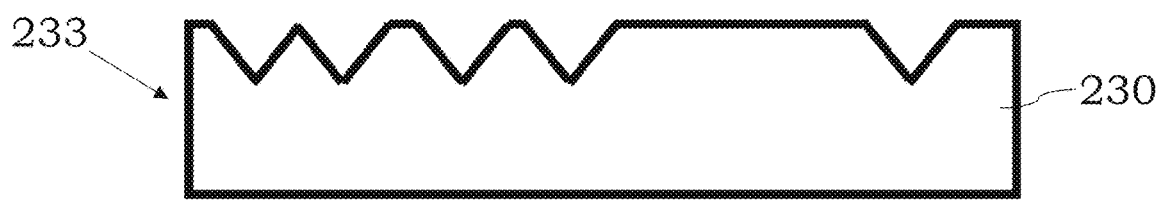
Figure 2D:

In certain configurations, a plurality of depressions may be present across a surface of a core layer as shown in FIGS. 2A-2C. Referring to FIG. 2A, a core layer 210 is shown that comprises a plurality of depressions on a first surface 212. The depressions may have the same or different shapes, widths or depths as desired. The depression distribution need not be uniform, and, if desired, more depressions may be positioned at one area of the core layer than other areas of the core layer. Referring to FIG. 2B, a core layer 220 is shown with increased depressions positioned at edges 223, 225 of the core layer 220. FIG. 2C shows a depression distribution with the depressions positioned toward one side or edge 233 of a core layer 230. FIG. 2D shows a depression distribution with more depressions positioned toward a center area of a core layer 240. As noted in more detail below, one or more skin layers or additional layers can be present on one or more surfaces of the core layers shown in FIGS. 2A-2D.

In certain embodiments, the core layers shown in FIGS. 2A-2D may each comprise a honeycomb core layer such as, for example a paper honeycomb core layer, a polyurethane layer, an expanded foam, an extruded foam, a honeycomb structure produced from one or more polymeric materials including, but not limited to, polypropylene, polyethylene, polystyrene, a polyamide, a copolyamide, polyethylene terephthalate, a polyetherimide, a polyphenylene oxide, and other polymers, a honeycomb structure produced from one or more metals including, but not limited to, aluminum, iron, steel and other metals and metal alloys. In some embodiments, the core layer may be a honeycomb layer with a material other than cellulose. For example, the honeycomb layer may be porous and include significant open space within the core layer. The core layers shown in FIGS. 2A-2D may comprise a basis weight of about 200 grams per square meter (gsm) to about 4000 gsm. The overall thickness of the core layers shown in FIGS. 1A-1I may vary from about 0.5 cm to about 7.5 cm. The depth of the depressions shown in the core layers FIGS. 2A-2D can vary from about 0.125 inches (about 3 mm) to about 1 inch (about 2.5 cm), e.g., about 5 mm to about 1.25 mm, depending on the overall thickness of the core layer. As noted herein, different depressions can have different depths and/or geometries.

Figure 3A:
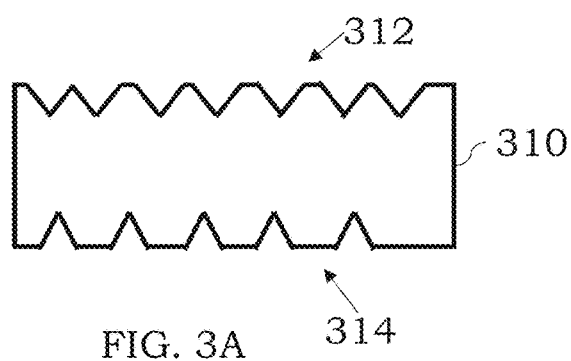
FIGS. 3A, 3B, 3C and 3D are illustrations of a core layer including a plurality of depressions in two surfaces.
Figure 3B:
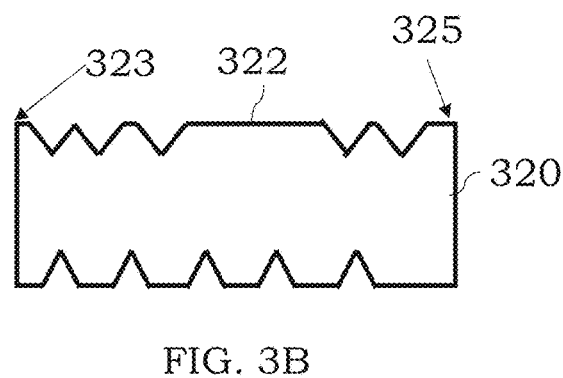
Figure 3C:
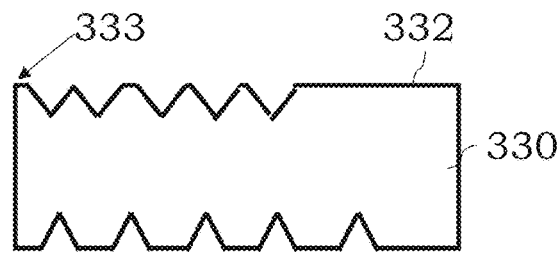
Figure 3D:
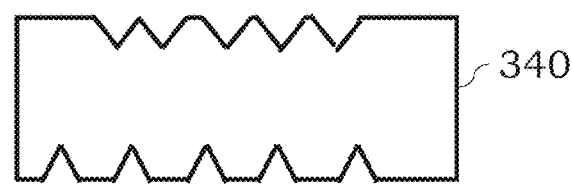

In some embodiments, two or more surfaces of a core layer may comprise a plurality of depressions. Referring to FIG. 3A, a core layer 310 is shown that comprises a plurality of depressions on a first surface 312 and on a second surface 314. The depressions on any one surface may have the same or different shapes, widths or depths as desired. Further, depressions on the first surface 312 may all have a first shape (when viewed in cross-section) and depressions on the second surface 314 may all have a second shape (when viewed in cross-section). The first shape may be the same or different than the second shape. The depression distribution on each of the first surface 312 and the second surface 314 need not be uniform, and, if desired, more depressions may be positioned at one area of the core layer than other areas of the core layer. Further, the depression distribution need not be the same on each of the first surface 312 and the second surface 314. Referring to FIG. 3B, a core layer 320 is shown with increased depressions positioned at edges 323, 325 on a first surface 322 of the core layer 320. FIG. 3C shows a depression distribution with the depressions positioned toward one side or edge 333 of a first surface 332 of a core layer 330. FIG. 3D shows a depression distribution with more depressions positioned toward a center area of a core layer 340. While the depressions on the second surface of the core layers 310, 320, 330, 340 are shown for illustration purposes as being uniform, the depression distribution could instead be non-uniform or asymmetric as described in connection with the depressions on the first surface of the core layers 310, 320, 330 and 340. As noted in more detail below, one or more skin layers or additional layers can be present on one or more surfaces of the core layers shown in FIGS. 3A-3D.

In certain embodiments, the core layers shown in FIGS. 3A-3D may each comprise a honeycomb core layer such as, for example, a paper honeycomb core layer, a polyurethane layer, an expanded foam, an extruded foam, a honeycomb structure produced from one or more polymeric materials including, but not limited to, polypropylene, polyethylene, polystyrene, a polyimide, a copolyamide, polyethylene terephthalate, a polyetherimide, a polyphenylene oxide, and other polymers, a honeycomb structure produced from one or more metals including, but not limited to, aluminum, iron, steel and other metals and metal alloys. In some embodiments, the core layer may be a honeycomb layer with a material other than cellulose. For example, the honeycomb layer may be porous and include significant open space within the core layer. The core layers shown in FIGS. 3A-3D may comprise a basis weight of about 200 grams per square meter (gsm) to about 4000 gsm. The overall thickness of the core layers shown in FIGS. 1A-1I may vary from about 0.5 cm to about 7.5 cm. The depth of the depressions shown in the core layers FIGS. 3A-3D can vary from about 0.125 inches (about 3 mm) to about 1 inch (about 2.5 cm), e.g., about 5 mm to about 1.25 mm, depending on the overall thickness of the core layer. As noted herein, different depressions can have different depths and/or geometries.

In certain configurations, the core layers described herein can be used to provide a multilayer assembly that includes the core layer in combination with a skin layer or other layer. While the exact configuration of the skin layer may vary, the skin layer can be configured as a porous fiber reinforced thermoplastic layer disposed on a first surface of core layer. The porous fiber reinforced thermoplastic layer may include a web of open celled structures formed by a plurality of reinforcing materials, e.g., reinforcing fibers, held together with a thermoplastic material, e.g., a polyolefin material or other materials. The porous fiber reinforced thermoplastic layer can be bonded to surfaces of the plurality of depressions across a first surface of the core layer, e.g., the skin layer may have depressions that generally mirror the depressions in the core layer so each depression includes two layers, e.g., a core layer component and skin layer component. Various illustrations of multilayer assembly with a core layer and one or more skin layers are described in more detail below.

Figure 4A:
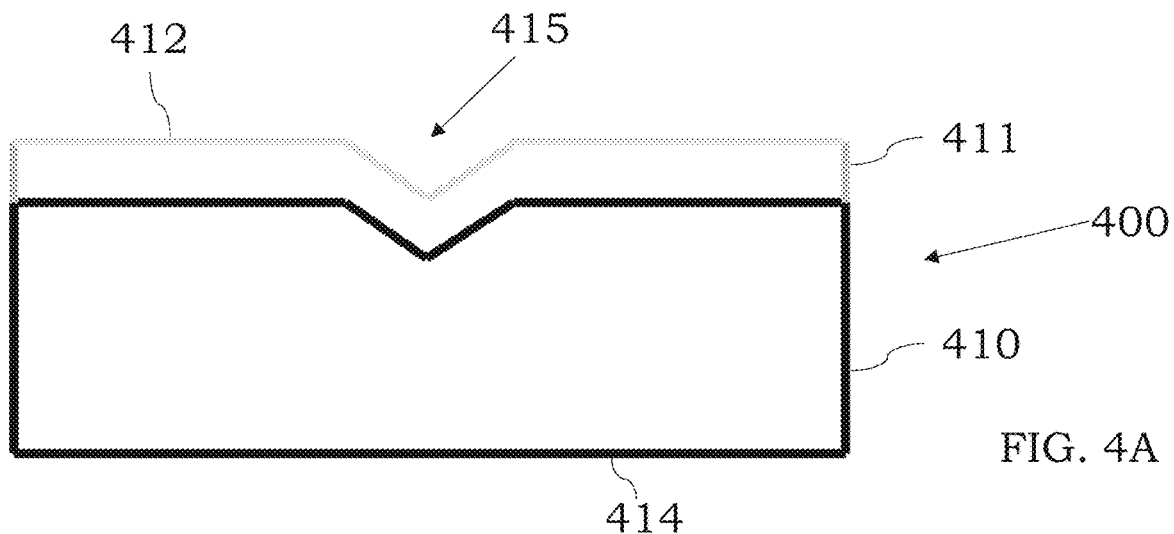
FIGS. 4A, 4B, 4C, 4D, 4E, 4F, 4G, 4H and 4I are illustrations of a multilayer assembly including a core layer and a skin layer and including one or more depressions in at least one surface.

In some configurations, the multilayer assembly may comprise a core layer and a single skin layer with one or more surface depressions on a surface of a multilayer assembly. Referring to FIG. 4A, a multilayer assembly 400 comprises a core layer 410, a skin layer 411 and a depression 415 on a first surface 412 of the multilayer assembly 400. The exact shape, width and depth of the depression 415 may vary and illustrative shapes (when viewed in cross-section) include triangular shapes, semi-circular shapes, elliptical shapes, symmetric shapes, asymmetric shapes and other shapes. While the depression 415 is shown as being present on a first surface 412, it could instead be present on the surface 414 or a depression may be present on a surface 412 and a surface 414. The depression 415 includes both the core layer 410 and the skin layer 411. The presence of a depression 415 can enhance bonding of the skin layer 411 to the core layer 410.

Figure 4B:
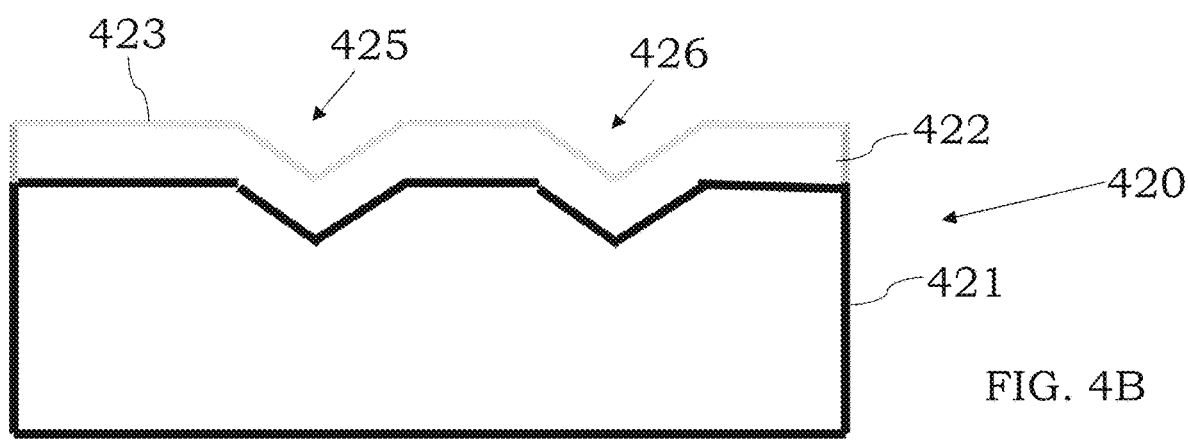
Figure 4C:
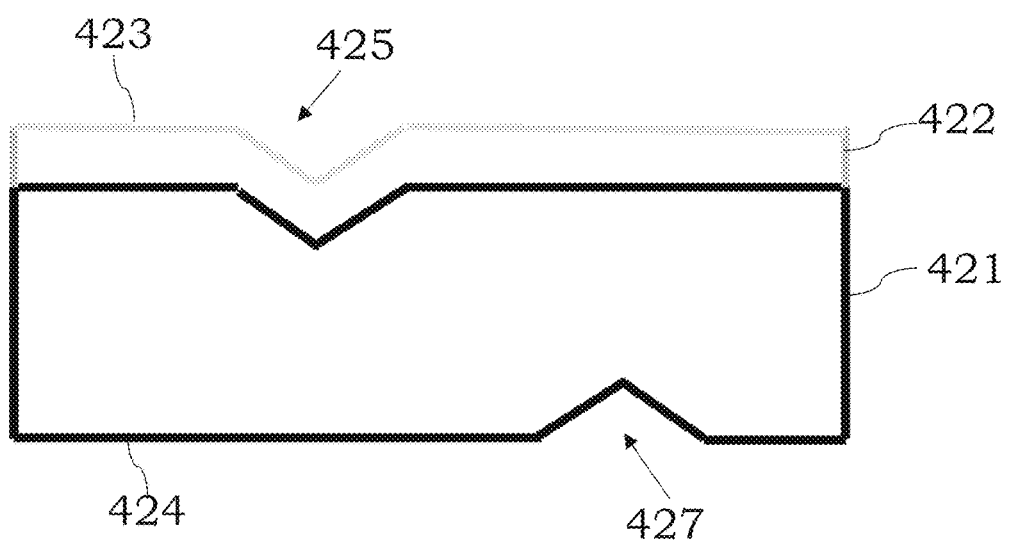

In certain embodiments, a multilayer assembly 420 is shown in FIG. 4B as including a core layer 421 and a skin layer 422. A first depression 425 on a first surface 423 and a second depression 426 on the first surface 423 are shown. The depressions 425, 426 need not be the same, and the exact shape, width and depth of the depressions 425, 426 each may independently vary and illustrative shapes (when viewed in cross-section) include triangular shapes, semi-circular shapes, elliptical shapes, symmetric shapes, asymmetric shapes and other shapes. In some instances, one of the depressions may instead be present on a second surface as shown in FIG. 4C, where a second depression 427 is present on a second surface 424 of a multilayer assembly. Where two depressions are present on different surfaces of a multilayer assembly, the shape, width and depth of the depressions can be the same or can be different. While not shown, a skin layer or other layer may be present on the surface 424 if desired.

Figure 4D:
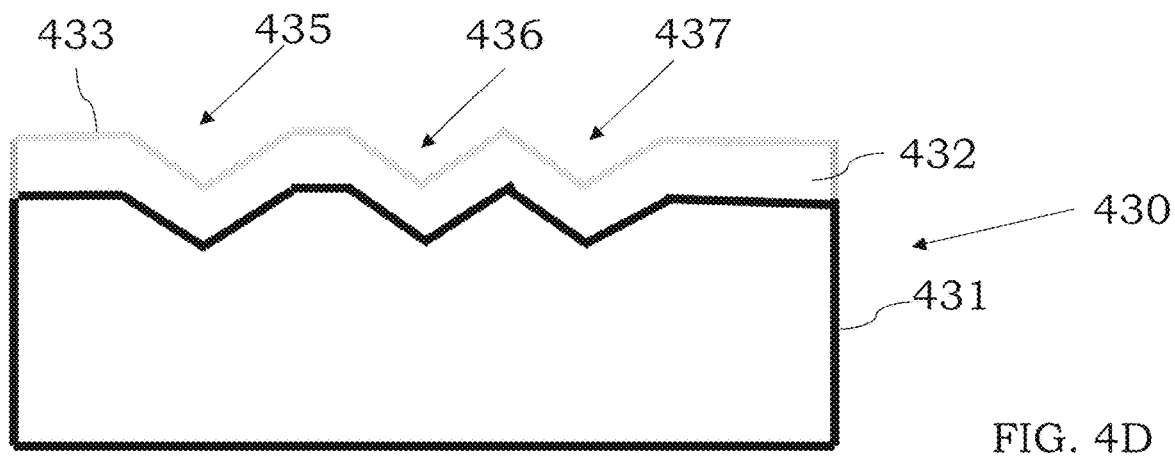
Figure 4E:
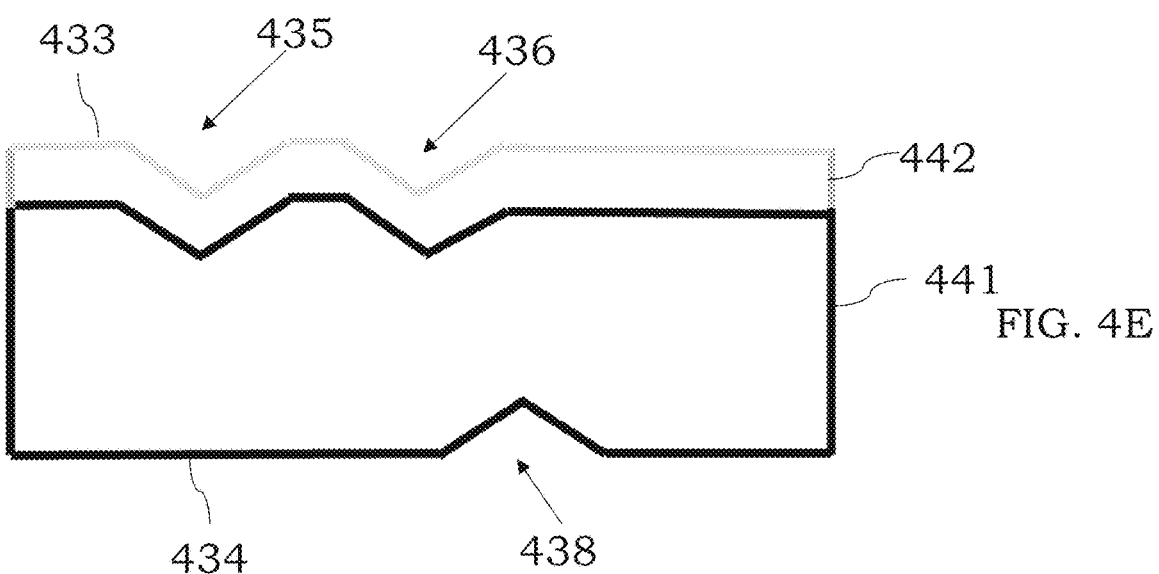

In other configurations, a multilayer assembly including at least one skin layer can include three or more depressions. Referring to FIG. 4D, a multilayer assembly 430, including a core layer 431 and a skin layer 432, is shown that comprises depressions 435, 436 and 437 on a first surface 433. The depressions 435, 436, 437 need not be the same, and the exact shape, width and depth of the depressions 435, 436, 437 each may independently vary and illustrative shapes (when viewed in cross-section) include triangular shapes, semi-circular shapes, elliptical shapes, symmetric shapes, asymmetric shapes and other shapes. In some instances, one of the depressions may instead be present on a second surface as shown in FIG. 4E, where a third depression 438 is present on a second surface 434 of a multilayer assembly. If desired, two or more of the depressions may be present on the surface 434 of the multilayer assembly. Where three depressions are present on different surfaces of a multilayer assembly, the shape, width and depth of the depressions can be the same or can be different. While not shown, a skin layer or other layer may be present on the surface 434 if desired.

Figure 4F:
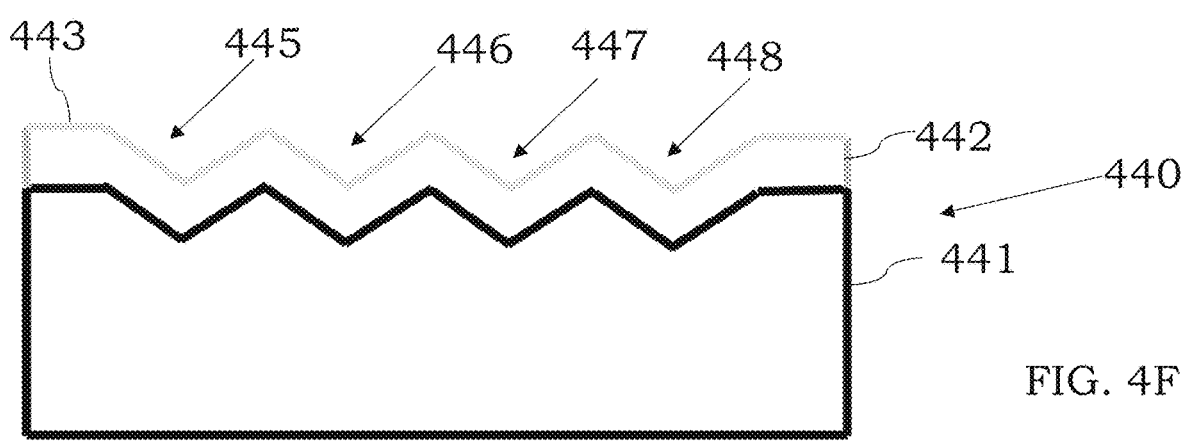
Figure 4G:
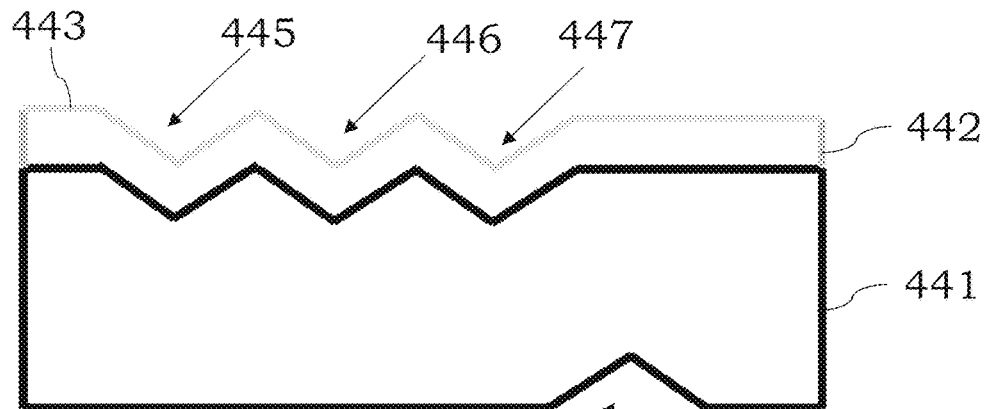

In some embodiments, a multilayer assembly can include four or more depressions. Referring to FIG. 4F, a multilayer assembly 440 including a core layer 441 and a skin layer 442 is shown that comprises depressions 445, 446, 447 and 448 on a first surface 443. The depressions 445, 446, 447, 448 need not be the same, and the exact shape, width and depth of the depressions 445, 446, 447, 448 each may independently vary and illustrative shapes (when viewed in cross-section) include triangular shapes, semi-circular shapes, elliptical shapes, symmetric shapes, asymmetric shapes and other shapes. In some instances, one of the depressions may instead be present on a second surface as shown in FIG. 4G, where a fourth depression 449 is present on a second surface 444 of a multilayer assembly. If desired, two or more of the depressions may be present on the surface 444 of a multilayer assembly. Where four depressions are present on different surfaces of the multilayer assembly 440, the shape, width and depth of the depressions can be the same or can be different. While not shown, a skin layer or other layer may be present on the surface 444 if desired.

Figure 4H:
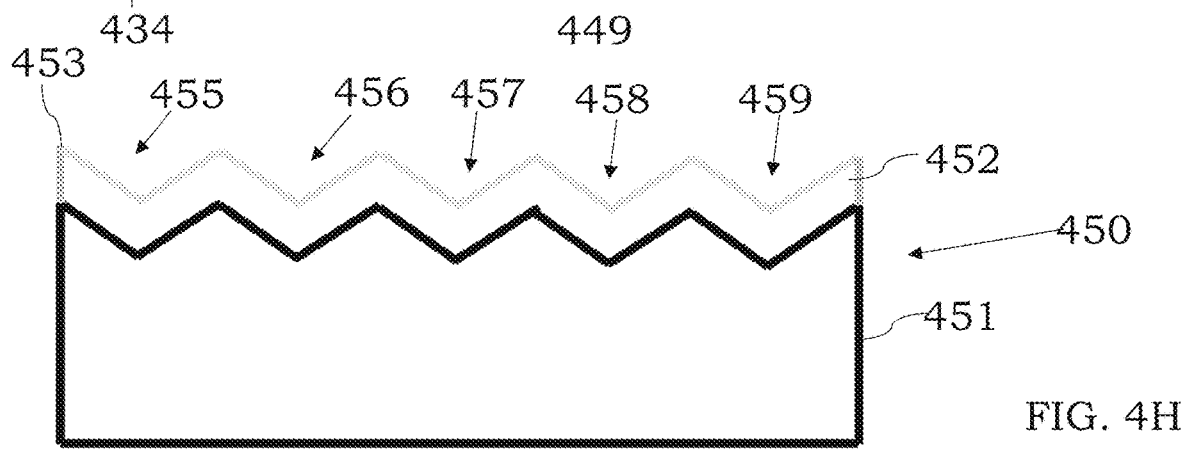
Figure 4I:
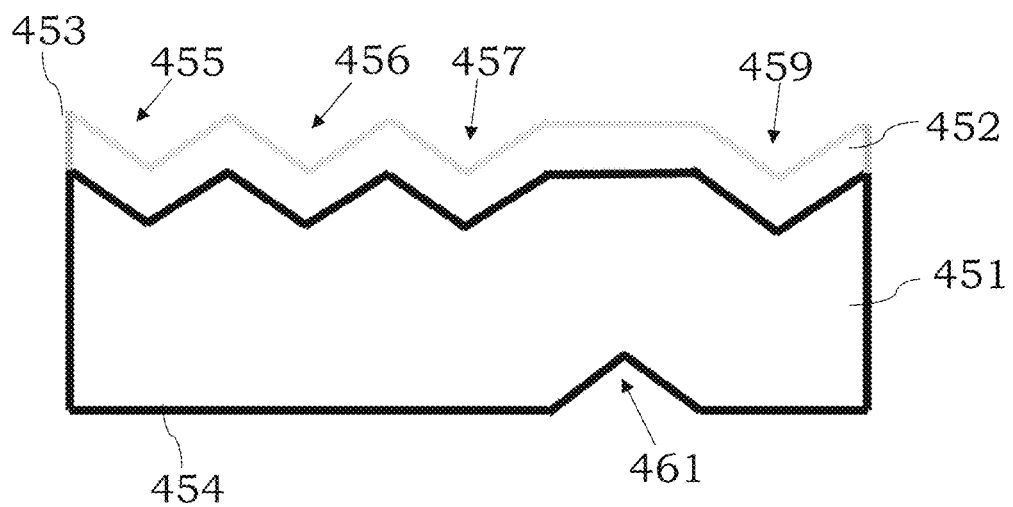

In some embodiments, a core layer can include five or more depressions. Referring to FIG. 4H, a multilayer assembly 450 is shown that includes a core layer 451 and a skin layer 452 and depressions 455, 456, 457, 458, and 459 on a first surface 453. The depressions 455, 456, 457, 458, 459 need not be the same, and the exact shape, width and depth of the depressions 455, 456, 457, 458, 459 each may independently vary and illustrative shapes (when viewed in cross-section) include triangular shapes, semi-circular shapes, elliptical shapes, symmetric shapes, asymmetric shapes and other shapes. In some instances, one of the depressions may instead be present on a second surface as shown in FIG. 4I, where a fifth depression 461 is present on a second surface 454 of a multilayer assembly. If desired, two or more of the depressions may be present on the surface 454 of a multilayer assembly. Where five depressions are present on different surfaces of a multilayer assembly, the shape, width and depth of the depressions can be the same or can be different. While not shown, a skin layer or other layer may be present on the surface 454 if desired.

In certain embodiments, the core layers shown in FIGS. 4A-4I may each comprise a honeycomb core layer such as, for example, a paper honeycomb core layer, a polyurethane layer, an expanded foam, an extruded foam, a honeycomb structure produced from one or more polymeric materials including, but not limited to, polypropylene, polyethylene, polystyrene, a polyamide, a copolyamide, polyethylene terephthalate, a polyetherimide, a polyphenylene oxide, and other polymers, a honeycomb structure produced from one or more metals including, but not limited to, aluminum, iron, steel and other metals and metal alloys. In some embodiments, the core layer may be a honeycomb layer with a material other than cellulose. For example, the honeycomb layer may be porous and include significant open space within the core layer. The core layers shown in FIGS. 4A-4I may comprise a basis weight of about 200 grams per square meter (gsm) to about 4000 gsm. The overall thickness of the core layers shown in FIGS. 4A-4I may vary from about 0.5 cm to about 7.5 cm. The depth of the depressions shown in the core layers FIGS. 4A-4I can vary from about 0.125 inches (about 3 mm) to about 1 inch (about 2.5 cm), e.g., about 5 mm to about 1.25 mm, depending on the overall thickness of the core layer. As noted herein, different depressions can have different depths and/or geometries.

In certain examples, the skin layers shown in FIGS. 4A-4I may each comprise a porous fiber reinforced thermoplastic layer. For example, the porous fiber reinforced thermoplastic layer may be configured as (or used in) a glass mat thermoplastic composite (GMT) or a light weight reinforced thermoplastic (LWRT). One such LWRT is prepared by FIANWHA AZDEL, Inc. and sold under the trademark SUPERLITE® material. The areal density of such a GMT or LWRT can range from about 300 grams per square meter (gsm) of the GMT or LWRT to about 4000 gsm, although the areal density may be less than 300 gsm or greater than 4000 gsm depending on the specific application needs. In some embodiments, the upper density can be less than about 4000 gsm. In certain instances, the GMT or the LWRT may comprise one or more lofting agent materials disposed in void space or pores of the GMT or the LWRT. Where two or more GMT or LWRT layers are present, the GMT or LWRT layers may be the same or may be different.

In certain examples where an LWRT is used as a porous fiber reinforced thermoplastic skin layer, the LWRT typically includes a thermoplastic material and a plurality of reinforcing fibers which together form a web of open celled structures. The web can be formed from a random arrangement of reinforcing fibers that are held in place by the thermoplastic material. For example, the porous fiber reinforced thermoplastic layer typically comprises a substantial amount of open cell structure such that void space is present in the layers. In some instances, the porous fiber skin layers shown in FIGS. 4A-4I may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 70-80%, 70-90%, 70-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the skin layers shown in FIGS. 4A-4I comprise a porosity or void content of greater than 0%, e.g., is not fully consolidated, up to about 95%. Unless otherwise stated, the reference to the skin layers shown in FIGS. 4A-4I comprising a certain void content or porosity is based on the total volume of that skin layer and not necessarily the total volume of the multilayer assembly.

In certain examples, the skin layers shown in FIGS. 4A-4I can be produced in the form of a GMT or LWRT sheet. In certain instances, the sheet can be generally prepared using chopped glass fibers, a thermoplastic material, optionally a lofting agent and an optional thermoplastic polymer film or films and/or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend can be used as a resin. To produce the sheet, a thermoplastic material and reinforcing materials can be added or metered into a dispersing foam contained in an open top mixing tank fitted with an impeller. Without wishing to be bound by any particular theory, the presence of trapped pockets of air of the foam can assist in dispersing the glass fibers, the thermoplastic material and the lofting agent. In some examples, the dispersed mixture of fibers and thermoplastic material can be pumped to a head-box located above a wire section of a paper machine via a distribution manifold. The foam, not the fibers and thermoplastic, can then be removed as the dispersed mixture is provided to a moving wire screen using a vacuum, continuously producing a uniform, fibrous wet web. The wet web can be passed through a dryer at a suitable temperature to reduce moisture content and to melt or soften the thermoplastic material. The resulting product may be pressed or compressed, e.g., using nip rollers or other techniques, to form a sheet which can then be coupled to a core layer or another layer.

In certain embodiments, the high porosity present in the skin layers shown in FIGS. 4A-4I can reduce the overall weight of the multi layer assembly and can permit the inclusion of agents within the void space of the skin layers. For example, lofting agents can reside in the void space in a non-covalently bonded manner. Application of heat or other perturbations can act to increase the volume of the non-covalently bonded lofting agent which in turn increases the overall thickness of the layer, e.g., the layer increases as the size of the lofting agent increases and/or additional air becomes trapped in the layer. If desired, flame retardants, colorants, smoke suppressants and other materials may be included in the void space of the skin layers shown in FIGS. 4A-4I. Prior to lofting, the multilayer assembly can be compressed to reduce its overall thickness, e.g., compressed before or after the layer is coupled to one or more other layers.

In certain embodiments, the thermoplastic material of the skin layers shown in FIGS. 4A-4I may comprise, at least in part, a polyolefin or one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, co-polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenyl ene) compounds commercially known as PARMAX®, high heat polycarbonate such as Bayer's APEC® PC, high temperature nylon, and silicones, as well as copolymers, alloys and blends of these materials with each other or other polymeric materials. The thermoplastic material used to form the skin layers shown in FIGS. 4A-4I can be used in powder form, resin form, rosin form, particle form, fiber form or other suitable forms. Illustrative thermoplastic materials in various forms are described herein and are also described, for example in U.S. Publication Nos, 20130244528 and US20120065283. The exact amount of thermoplastic material present in the skin layers shown in FIGS. 4A-4I can vary and illustrative amounts range from about 20% by weight to about 80% by weight, e.g., 30-70 percent by weight or 35-65 percent by weight. It will be recognized by the skilled person that the weight percentages of all materials used in any one of the skin layers shown in FIGS. 4A-4I will add to 100 weight percent.

In certain examples, the reinforcing fibers of the skin layers shown in FIGS. 4A-4I may comprise glass fibers, carbon fibers, graphite fibers, synthetic organic fibers, particularly high modulus organic fibers such as, for example, para- and meta-aramid fibers, nylon fibers, polyester fibers, or high melt flow index resins that are suitable for use as fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material, the lofting agent or both. The fiber content in the skin layers shown in FIGS. 4A-4I may independently be from about 20% to about 90% by weight of the layer, more particularly from about 30% to about 70%, by weight of the layer. Typically, the fiber content of a multilayer assembly comprising the skin layers shown in FIGS. 4A-4I varies between about 20% to about 90% by weight, more particularly about 30% by weight to about 80% by weight, e.g., about 40% to about 70% by weight of the assembly. The particular size and/or orientation of the fibers used may depend, at least in part, on the thermoplastic polymer material used and/or the desired properties of the skin layers shown in FIGS. 4A-4I. Suitable additional types of fibers, fiber sizes and amounts will be readily selected by the person of ordinary skill in the art; given the benefit of this disclosure. In one non-limiting illustration, fibers dispersed within a thermoplastic material and optionally a lofting agent to provide the skin layers shown in FIGS. 4A-4I can generally have a diameter of greater than about 5 microns, more particularly from about 5 microns to about 22 microns, and a length of from about 5 mm to about 200 mm; more particularly, the fiber diameter may be from about 2 microns to about 22 microns and the fiber length may be from about 5 mm to about 75 mm.

In some embodiments, the lofting capacity of the skin layers shown in FIGS. 4A-4I can be further tuned by including one or more added lofting agents. The exact type of lofting agent used in the skin layers shown in FIGS. 4A-4I can depend on numerous factors including, for example, the desired lofting temperature, the desired degree of loft, etc. In some instances, microsphere lofting agents, e.g., expandable microspheres, which can increase their size upon exposure to convection heating may be used. Illustrative commercially available lofting agents are available from Kureha Corp, (Japan). In other instances, a first lofting agent with a first average particle size and a second lofting agent with a second average particle size, different from the first average particle size, may be used in the skin layers shown in FIGS. 4A-4I. In other examples, the lofting agent may be an expandable graphite materials which can also impart some flame retardancy to the multilayer assembly.

In some configurations, the skin layers shown in FIGS. 4A-4I may be a substantially, halogen free or halogen free layer to meet the restrictions on hazardous substances requirements for certain applications. In other instances, one or more of the layers may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the skin layers shown in FIGS. 4A-4I may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the layer), more particularly about 1 weight percent to about 13 weight percent, e.g., about 5 weight percent to about 13 weight percent. If desired, two different halogenated flame retardants may be added to the layers. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the layers may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the layer), more particularly about 1 weight percent to about 13 weight percent, e.g., about 5 weight percent to about 13 weight percent based on the weight of the layer. If desired, two different substantially halogen free flame retardants may be added to one or more of the layers described herein. In certain instances, one or more of the skin layers shown in FIGS. 4A-4I described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the layer), more particularly about 1 weight percent to about 15 weight percent, e.g., about 2 weight percent to about 14 weight percent based on the weight of the layer. The flame retardant agents used in the layers described herein can be added to the mixture comprising the thermoplastic material and fibers (prior to disposal of the mixture on a wire screen or other processing component) or can be added after the layer is formed. In some examples, the flame retardant material may comprise one or more of expandable graphite materials, magnesium hydroxide (MDH) and aluminum hydroxide (ATH).

In certain embodiments, the skin layers shown in FIGS. 4A-4I may comprise one or more film layers in combination with a porous fiber reinforced thermoplastic layer. For example, the film of the skin layers shown in FIGS. 4A-4I may comprise or be a thermoplastic film, a polyolefin film, an elastomer film, etc. In certain configurations, the film comprises at least one of a polyolefin, e.g., polyethylene or polypropylene, at least one poly(ether imide), at least one poly(ether ketone), at least one poly(ether-ether ketone), at least one poly(phenylene sulfide), poly(arylene sulfone), at least one poly(ether sulfone), at least one poly(amide-imide), poly(1,4-phenylene), at least one polycarbonate, at least one nylon, and at least one silicone. In some embodiments, two or more films may be present in combination with a porous fiber reinforced thermoplastic layer for the skin layers shown in FIGS. 4A-4I.

Figure 5A:
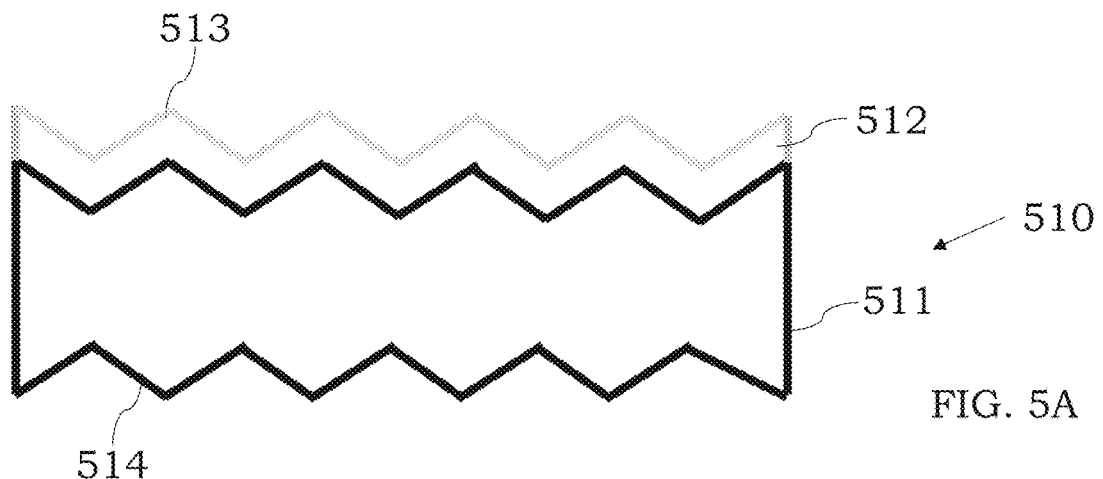
FIGS. 5A and 5B are illustrations of a multilayer assembly including a plurality of depressions in a surface.
Figure 5B:
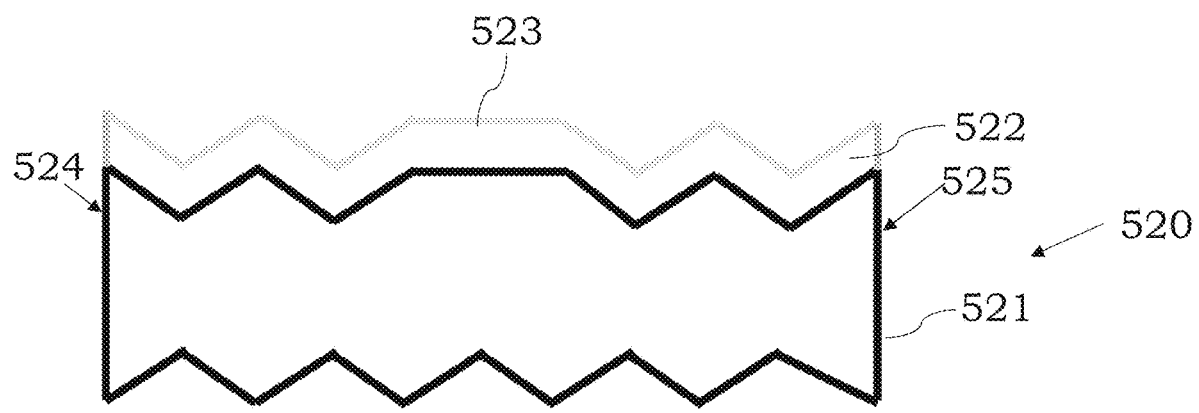

In some embodiments, two or more surfaces of a multilayer assembly that includes a core layer and a skin layer may comprise a plurality of depressions. Referring to FIG. 5A, a multilayer assembly 510 is shown that comprises a plurality of depressions on a first surface 513 and on a second surface 514. In some instances, different surfaces may include a different number of depressions, depressions of different depth, depressions of different shape, etc. The first surface 513 comprises a skin layer 512 on a core layer 511. The depressions on any one surface may have the same or different shapes, widths or depths as desired. Further, depressions on the first surface 513 may all have a first shape (when viewed in cross-section) and depressions on the second surface 514 may all have a second shape (when viewed in cross-section). The first shape may be the same or different than the second shape. The depression distribution on each of the first surface 513 and the second surface 514 need not be uniform, and, if desired, more depressions may be positioned at one area of the core layer than other areas of the core layer. Further, the depression distribution need not be the same on each of the first surface 513 and the second surface 514. Referring to FIG. 5B, a multilayer assembly 520 is shown with a core layer 521 and a skin layer 522 and with increased depressions positioned at edges 524, 525 on a first surface 523 of the multilayer assembly 520. The distribution of the depressions may also have other arrangements. For example, an increased number of depressions can be positioned toward one side or edge 524 on the first surface 523. Alternatively, a depression distribution with more depressions positioned toward a center area of a multilayer assembly can be produced. While the depressions on the second surface of the multilayer assemblies 510, 520, are shown for illustration purposes as being uniform, the depression distribution could instead be non-uniform or asymmetric as described in connection with the depressions on the first surface of the multilayer assemblies 510, 520.

In certain embodiments, the core layers shown in FIGS. 5A, 5B may each comprise a honeycomb core layer such as, for example, a paper honeycomb core layer, a polyurethane layer, an expanded foam, an extruded foam, a honeycomb structure produced from one or more polymeric materials including, but not limited to, polypropylene, polyethylene, polystyrene, a polyamide, a copolyamide, polyethylene terephthalate, a polyetherimide, a polyphenylene oxide, and other polymers, a honeycomb structure produced from one or more metals including, but not limited to, aluminum, iron, steel and other metals and metal alloys. In some embodiments, the core layer may be a honeycomb layer with a material other than cellulose. For example, the honeycomb layer may be porous and include significant open space within the core layer. The core layers shown in FIGS. 5A, 5B may comprise a basis weight of about 200 grams per square meter (gsm) to about 4000 gsm. The overall thickness of the core layers shown in FIGS. 5A, 5B may vary from about 0.5 cm to about 7.5 cm. The depth of the depressions shown in the core layers FIGS. 5A, 5B can vary from about 0.125 inches (about 3 mm) to about 1 inch (about 2.5 cm), e.g., about 5 mm to about 1.25 mm, depending on the overall thickness of the core layer. As noted herein, different depressions can have different depths and/or geometries.

In certain examples, the skin layers shown in FIGS. 5A, 5B may each comprise a porous fiber reinforced thermoplastic layer. For example, the porous fiber reinforced thermoplastic layer may be configured as (or used in) a glass mat thermoplastic composite (GMT) or a light weight reinforced thermoplastic (LWRT). One such LWRT is prepared by HANWHA AZDEL, Inc. and sold under the trademark SUPERLITE® material. The areal density of such a GMT or LWRT can range from about 300 grams per square meter (gsm) of the GMT or LWRT to about 4000 gsm, although the areal density may be less than 300 gsm or greater than 4000 gsm depending on the specific application needs. In some embodiments, the upper density can be less than about 4000 gsm. In certain instances, the GMT or the LWRT may comprise one or more lofting agent materials disposed in void space or pores of the GMT or the LWRT. Where two or more GMT or LWRT layers are present, the GMT or LWRT layers may be the same or may be different.

In certain examples where an LWRT is used as a porous fiber reinforced thermoplastic skin layer, the LWRT typically includes a thermoplastic material and a plurality of reinforcing fibers which together form a web of open celled structures. The web can be formed from a random arrangement of reinforcing fibers that are held in place by the thermoplastic material. For example, the porous fiber reinforced thermoplastic layer typically comprises a substantial amount of open cell structure such that void space is present in the layers. In some instances, the porous fiber skin layers shown in FIGS. 5A, 5B may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the skin layers shown in FIGS. 5A, 5B comprise a porosity or void content of greater than 0%, e.g., is not fully consolidated, up to about 95%. Unless otherwise stated, the reference to the skin layers shown in FIGS. 5A, 5B comprising a certain void content or porosity is based on the total volume of that skin layer and not necessarily the total volume of the multilayer assembly.

In certain examples, the skin layers shown in FIGS. 5A, 5B can be produced in the form of a GMT or LWRT sheet. In certain instances, the sheet can be generally prepared using chopped glass fibers, a thermoplastic material, optionally a lofting agent and an optional thermoplastic polymer film or films and/or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend can be used as a resin. To produce the sheet, a thermoplastic material and reinforcing materials can be added or metered into a dispersing foam contained in an open top mixing tank fitted with an impeller. Without wishing to be bound by any particular theory, the presence of trapped pockets of air of the foam can assist in dispersing the glass fibers, the thermoplastic material and the lofting agent. In some examples, the dispersed mixture of fibers and thermoplastic material can be pumped to a head-box located above a wire section of a paper machine via a distribution manifold. The foam, not the fibers and thermoplastic, can then be removed as the dispersed mixture is provided to a moving wire screen using a vacuum, continuously producing a uniform, fibrous wet web. The wet web can be passed through a dryer at a suitable temperature to reduce moisture content and to melt or soften the thermoplastic material. The resulting product may be pressed or compressed, e.g., using nip rollers or other techniques, to form a sheet which can then be coupled to a core layer or another layer.

In certain embodiments, the high porosity present in the skin layers shown in FIGS. 5A, 5B can reduce the overall weight of the multi layer assembly and can permit the inclusion of agents within the void space of the skin layers. For example, lofting agents can reside in the void space in a non-covalently bonded manner. Application of heat or other perturbations can act to increase the volume of the non-covalently bonded lofting agent which in turn increases the overall thickness of the layer, e.g., the layer increases as the size of the lofting agent increases and/or additional air becomes trapped in the layer. If desired, flame retardants, colorants, smoke suppressants and other materials may be included in the void space of the skin layers shown in FIGS. 5A, 5B. Prior to lofting, the multilayer assembly can be compressed to reduce its overall thickness, e.g., compressed before or after the layer is coupled to one or more other layers.

In certain embodiments, the thermoplastic material of the skin layers shown in FIGS. 5A, 5B may comprise, at least in part, a polyolefin or one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, co-polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as copolymers, alloys and blends of these materials with each other or other polymeric materials. The thermoplastic material used to form the skin layers shown in FIGS. 5A, 5B can be used in powder form, resin form, rosin form, particle form, fiber form or other suitable forms. Illustrative thermoplastic materials in various forms are described herein and are also described, for example in U.S. Publication Nos. 20130244528 and US20120065283. The exact amount of thermoplastic material present in the skin layers shown in FIGS. 5A, 5B can vary and illustrative amounts range from about 20% by weight to about 80% by weight, e.g., 30-70 percent by weight or 35-65 percent by weight. It will be recognized by the skilled person that the weight percentages of all materials used in any one of the skin layers shown in FIGS. 5A, 5B will add to 100 weight percent.

In certain examples, the reinforcing fibers of the skin layers shown in FIGS. 5A, 5B may comprise glass fibers, carbon fibers, graphite fibers, synthetic organic fibers, particularly high modulus organic fibers such as, for example, para- and meta-aramid fibers, nylon fibers, polyester fibers, or high melt flow index resins that are suitable for use as fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material, the lofting agent or both. The fiber content in the skin layers shown in FIGS. 5A, 5B may independently be from about 20% to about 90% by weight of the layer, more particularly from about 30% to about 70%, by weight of the layer. Typically, the fiber content of a multilayer assembly comprising the skin layers shown in FIGS. 5A, 5B varies between about 20% to about 90% by weight, more particularly about 30% by weight to about 80% by weight, e.g., about 40% to about 70% by weight of the assembly. The particular size and/or orientation of the fibers used may depend, at least in part, on the thermoplastic polymer material used and/or the desired properties of the skin layers shown in FIGS. 5A, 5B. Suitable additional types of fibers, fiber sizes and amounts will be readily selected by the person of ordinary skill in the art, given the benefit of this disclosure. In one non-limiting illustration, fibers dispersed within a thermoplastic material and optionally a lofting agent to provide the skin layers shown in FIGS. 5A, 5B can generally have a diameter of greater than about 5 microns, more particularly from about 5 microns to about 22 microns, and a length of from about 5 mm to about 200 mm; more particularly, the fiber diameter may be from about 2 microns to about 22 microns and the fiber length may be from about 5 mm to about 75 mm.

In some embodiments, the lofting capacity of the skin layers shown in FIGS. 5A, 5B can be further tuned by including one or more added lofting agents. The exact type of lofting agent used in the skin layers shown in FIGS. 5A, 5B can depend on numerous factors including, for example, the desired lofting temperature, the desired degree of loft, etc. In some instances, microsphere lofting agents, e.g., expandable microspheres, which can increase their size upon exposure to convection heating may be used. Illustrative commercially available lofting agents are available from Kureha Corp. (Japan). In other instances, a first lofting agent with a first average particle size and a second lofting agent with a second average particle size, different from the first average particle size, may be used in the skin layers shown in FIGS. 5A, 5B. In other examples, the lofting agent may be an expandable graphite material which can also impart some flame retardancy to the multilayer assembly.

In some configurations, the skin layers shown in FIGS. 5A, 5B may be a substantially halogen free or halogen free layer to meet the restrictions on hazardous substances requirements for certain applications. In other instances, one or more of the layers may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the skin layers shown in FIGS. 5A, 5B may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the layer), more particularly about 1 weight percent to about 13 weight percent, e.g., about 5 weight percent to about 13 weight percent. If desired, two different halogenated flame retardants may be added to the layers. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the layers may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the layer), more particularly about 1 weight percent to about 13 weight percent, e.g., about 5 weight percent to about 13 weight percent based on the weight of the layer. If desired, two different substantially halogen free flame retardants may be added to one or more of the layers described herein. In certain instances, one or more of the skin layers shown in FIGS. 5A, 5B described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the layer), more particularly about 1 weight percent to about 15 weight percent, e.g., about 2 weight percent to about 14 weight percent based on the weight of the layer. The flame retardant agents used in the layers described herein can be added to the mixture comprising the thermoplastic material and fibers (prior to disposal of the mixture on a wire screen or other processing component) or can be added after the layer is formed. In some examples, the flame retardant material may comprise one or more of expandable graphite materials, magnesium hydroxide (MDH) and aluminum hydroxide (ATH).

In certain configurations, the skin layers shown in FIGS. 5A, 5B may comprise one or more film layers in combination with a porous fiber reinforced thermoplastic layer. For example, the film of the skin layers shown in FIGS. 5A, 5B may comprise or be a thermoplastic film, a polyolefin film, an elastomer film, etc. In certain configurations, the film comprises at least one of a polyolefin, e.g.; polyethylene or polypropylene, at least one poly(ether imide), at least one poly(ether ketone), at least one poly(ether-ether ketone), at least one poly(phenylene sulfide), poly(arylene sulfone), at least one poly(ether sulfone), at least one poly(amide-imide), poly(1,4-phenylene), at least one polycarbonate, at least one nylon, and at least one silicone. In some embodiments, two or more films may be present in combination with a porous fiber reinforced thermoplastic layer for the skin layers shown in FIGS. 5A, 5B.

In certain configurations, the core layers described herein can be used to provide a multilayer assembly that includes the core layer in combination with two skin layers. While the exact configuration of the skin layers may vary, the skin layers each can be configured as a porous fiber reinforced thermoplastic layer disposed on a surface of a core layer. Each porous fiber reinforced thermoplastic layer may include a web of open celled structures formed by a plurality of reinforcing materials held together with a thermoplastic material. One or both of the porous fiber reinforced thermoplastic layer can be bonded to surfaces of the plurality of depressions across a first surface of the core layer, e.g., the skin layer may have depressions that generally mirror the depressions in the core layer so each depression includes two layers, e.g., a core layer component and skin layer component.

Figure 6A:
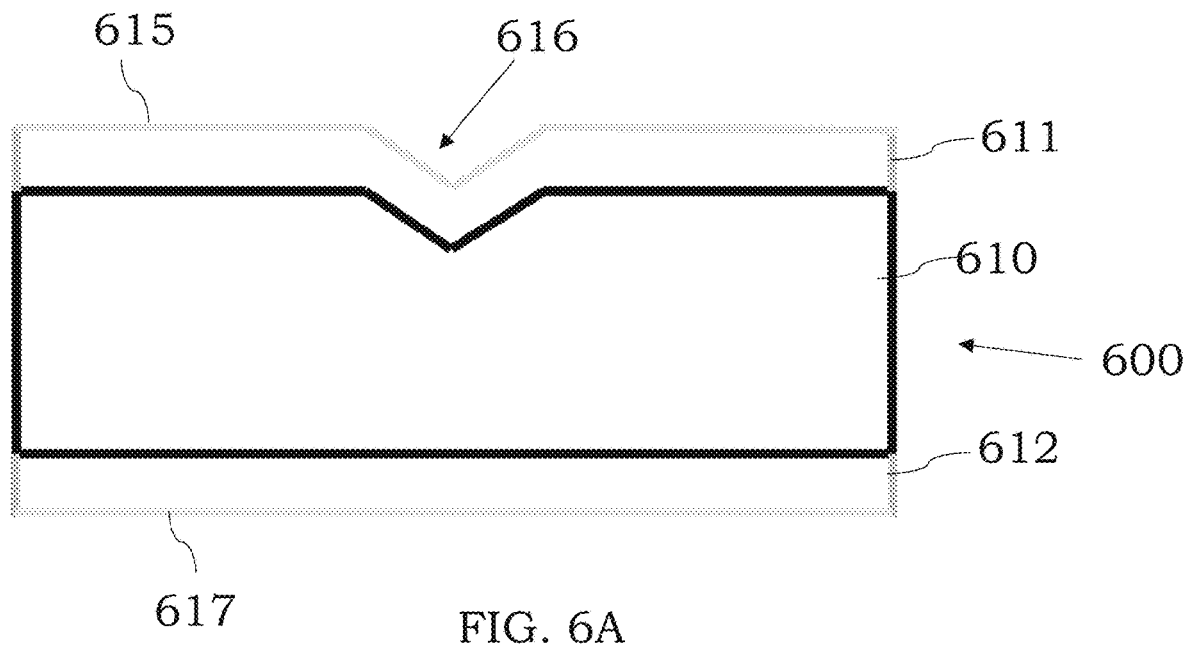
FIGS. 6A and 6B are illustrations of a multilayer assembly including a core layer and two skin layers and including one or more depressions in one or more surfaces.

Referring to FIG. 6A, a multilayer assembly 600 comprises a core layer 610, a first skin layer 611 and a second skin layer 612. A depression 616 on a first surface 615 of the multilayer assembly 600 is shown. The exact shape, width and depth of the depression 616 may vary and illustrative shapes (when viewed in cross-section) include triangular shapes, semi-circular shapes, elliptical shapes, symmetric shapes, asymmetric shapes and other shapes. While the depression 616 is shown as being present on a first surface 615, it could instead be present on the surface 617 or a depression may be present on a surface 616 and a surface 617. The depression 617 includes both the core layer 610 and the skin layer 611. The presence of a depression 616 can enhance bonding of the skin layer 611 to the core layer 610. In FIG. 6A, no depressions are present on the second surface 617 of the multilayer assembly 600. If desired, more than a single depression 616 may be present on the first surface 615. For example, the first surface 615 may comprise one, two, three, four, five or more individual depressions across the surface 615.

Figure 6B:
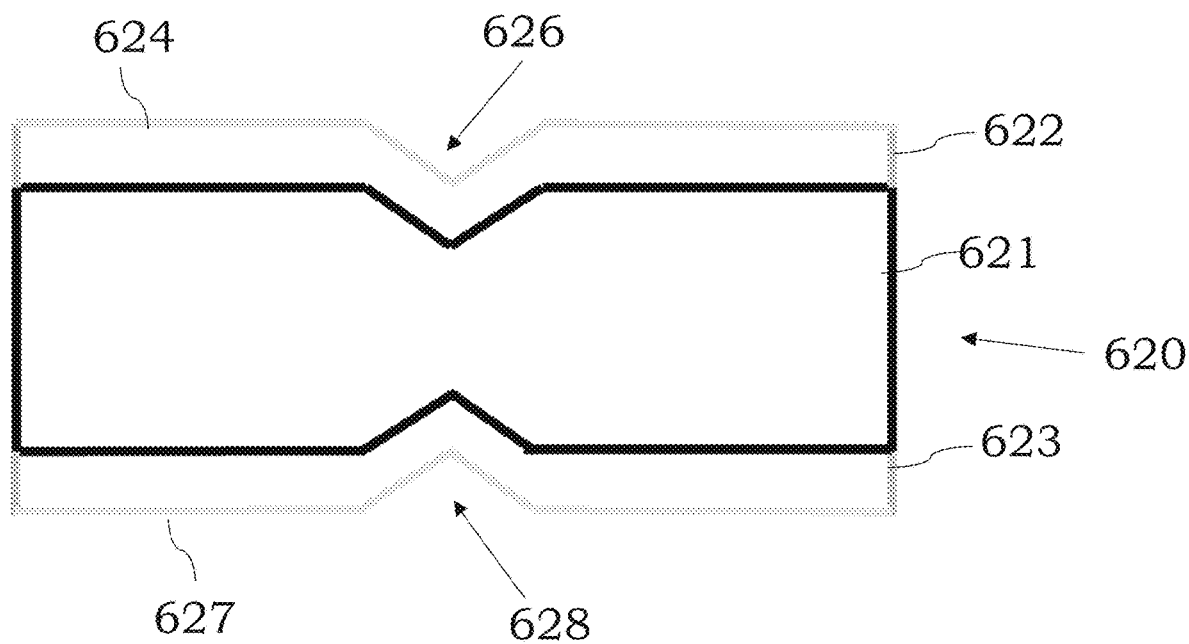

In certain embodiments, a multilayer assembly 620 is shown in FIG. 6B as including a core layer 621, a first skin layer 622 and a second skin layer 623. A first depression 626 is present on a first surface 624 and a second depression 628 is present on a second surface 627. The depressions 626, 628 need not be the same, and the exact shape, width and depth of the depressions 626, 628 each may independently vary and illustrative shapes (when viewed in cross-section) include triangular shapes, semi-circular shapes, elliptical shapes, symmetric shapes, asymmetric shapes and other shapes. In some instances, the surface 624 may comprise one, two, three, four, five or more depressions. Similarly, the surface 627 may comprise one, two, three, four, five or more depressions. The number of depressions on each of the surfaces 624, 627 need not be the same. By including depressions on different surfaces of a multilayer assembly 620 including a core layer 621 and two skin layers 622, 623, enhanced bonding of the different skin layers 622, 623 to the core layer 621 can be achieved.

In certain embodiments, the core layers shown in FIGS. 6A, 6B may each comprise a honeycomb core layer such as, for example, a paper honeycomb core layer, a polyurethane layer, an expanded foam, an extruded foam, a honeycomb structure produced from one or more polymeric materials including, but not limited to, polypropylene, polyethylene, polystyrene, a polyamide, a copolyamide, polyethylene terephthalate, a polyetherimide, a polyphenylene oxide, and other polymers, a honeycomb structure produced from one or more metals including, but not limited to, aluminum, iron, steel and other metals and metal alloys. In some embodiments, the core layer may be a honeycomb layer with a material other than cellulose. For example, the honeycomb layer may be porous and include significant open space within the core layer. The core layers shown in FIGS. 6A, 6B may comprise a basis weight of about 200 grams per square meter (gsm) to about 4000 gsm. The overall thickness of the core layers shown in FIGS. 6A, 6B may vary from about 0.5 cm to about 7.5 cm. The depth of the depressions shown in the core layers FIGS. 6A, 6B can vary from about 0.125 inches (about 3 mm) to about 1 inch (about 2.5 cm), e.g., about 5 mm to about 1.25 mm, depending on the overall thickness of the core layer. As noted herein, different depressions can have different depths and/or geometries.

In certain examples, the skin layers shown in FIGS. 6A, 6B may each comprise a porous fiber reinforced thermoplastic layer. For example, the porous fiber reinforced thermoplastic layer may be configured as (or used in) a glass mat thermoplastic composite (GMT) or a light weight reinforced thermoplastic (LWRT). One such LWRT is prepared by FIANWHA AZDEL, Inc. and sold under the trademark SUPERLITE® material. The areal density of such a GMT or LWRT can range from about 300 grams per square meter (gsm) of the GMT or LWRT to about 4000 gsm, although the areal density may be less than 300 gsm or greater than 4000 gsm depending on the specific application needs. In some embodiments, the upper density can be less than about 4000 gsm. In certain instances, the GMT or the LWRT may comprise one or more lofting agent materials disposed in void space or pores of the GMT or the LWRT. Where two or more GMT or LWRT layers are present, the GMT or LWRT layers may be the same or may be different.

In certain examples where an LWRT is used as a porous fiber reinforced thermoplastic skin layer, the LWRT typically includes a thermoplastic material and a plurality of reinforcing fibers which together form a web of open celled structures. The web can be formed from a random arrangement of reinforcing fibers that are held in place by the thermoplastic material. For example, the porous fiber reinforced thermoplastic layer typically comprises a substantial amount of open cell structure such that void space is present in the layers. In some instances, the porous fiber skin layers shown in FIGS. 6A, 6B may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 70-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the skin layers shown in FIGS. 6A, 6B comprise a porosity or void content of greater than 0%, e.g., is not fully consolidated, up to about 95%. Unless otherwise stated, the reference to the skin layers shown in FIGS. 6A, 6B comprising a certain void content or porosity is based on the total volume of that skin layer and not necessarily the total volume of the multilayer assembly.

In certain examples, the skin layers shown in FIGS. 6A, 6B can be produced in the form of a GMT or LWRT sheet. In certain instances, the sheet can be generally prepared using chopped glass fibers, a thermoplastic material, optionally a lofting agent and an optional thermoplastic polymer film or films and/or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend can be used as a resin. To produce the sheet, a thermoplastic material and reinforcing materials can be added or metered into a dispersing foam contained in an open top mixing tank fitted with an impeller. Without wishing to be bound by any particular theory, the presence of trapped pockets of air of the foam can assist in dispersing the glass fibers, the thermoplastic material and the lofting agent. In some examples, the dispersed mixture of fibers and thermoplastic material can be pumped to a head-box located above a wire section of a paper machine via a distribution manifold. The foam, not the fibers and thermoplastic, can then be removed as the dispersed mixture is provided to a moving wire screen using a vacuum, continuously producing a uniform, fibrous wet web. The wet web can be passed through a dryer at a suitable temperature to reduce moisture content and to melt or soften the thermoplastic material. The resulting product may be pressed or compressed, e.g., using nip rollers or other techniques, to form a sheet which can then be coupled to a core layer or another layer.

In certain embodiments, the high porosity present in the skin layers shown in FIGS. 6A, 6B can reduce the overall weight of the multilayer assembly and can permit the inclusion of agents within the void space of the skin layers. For example, lofting agents can reside in the void space in a non-covalently bonded manner. Application of heat or other perturbations can act to increase the volume of the non-covalently bonded lolling agent which in turn increases the overall thickness of the layer, e.g., the layer increases as the size of the lofting agent increases and/or additional air becomes trapped in the layer. If desired, flame retardants, colorants, smoke suppressants and other materials may be included in the void space of the skin layers shown in FIGS. 6A, 6B. Prior to lofting, the multilayer assembly can be compressed to reduce its overall thickness, e.g., compressed before or after the layer is coupled to one or more other layers.

In certain embodiments, the thermoplastic material of the skin layers shown in FIGS. 6A, 6B may comprise, at least in part, a polyolefin or one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, co-polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as copolymers, alloys and blends of these materials with each other or other polymeric materials. The thermoplastic material used to form the skin layers shown in FIGS. 6A, 6B can be used in powder form, resin form, rosin form, particle form, fiber form or other suitable forms. Illustrative thermoplastic materials in various forms are described herein and are also described, for example in U.S. Publication Nos. 20130244528 and US20120065283. The exact amount of thermoplastic material present in the skin layers shown in FIGS. 6A, 6B can vary and illustrative amounts range from about 20% by weight to about 80% by weight, e.g., 30-70 percent by weight or 35-65 percent by weight. It will be recognized by the skilled person that the weight percentages of all materials used in any one of the skin layers shown in FIGS. 6A, 6B will add to 100 weight percent.

In certain examples, the reinforcing fibers of the skin layers shown in FIGS. 6A, 6B may comprise glass fibers, carbon fibers, graphite fibers, synthetic organic fibers, particularly high modulus organic fibers such as, for example, para- and meta-aramid fibers, nylon fibers, polyester fibers, or high melt flow index resins that are suitable for use as fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material, the lofting agent or both. The fiber content in the skin layers shown in FIGS. 6A, 6B may independently be from about 20% to about 90% by weight of the layer, more particularly from about 30% to about 70%, by weight of the layer. Typically, the fiber content of a multilayer assembly comprising the skin layers shown in FIGS. 6A, 6B varies between about 20% to about 90% by weight, more particularly about 30% by weight to about 80% by weight, e.g., about 40% to about 70% by weight of the assembly. The particular size and/or orientation of the fibers used may depend, at least in part, on the thermoplastic polymer material used and/or the desired properties of the skin layers shown in FIGS. 6A, 6B. Suitable additional types of fibers, fiber sizes and amounts will be readily selected by the person of ordinary skill in the art, given the benefit of this disclosure. In one non-limiting illustration, fibers dispersed within a thermoplastic material and optionally a lofting agent to provide the skin layers shown in FIGS. 6A, 6B can generally have a diameter of greater than about 5 microns, more particularly from about 5 microns to about 22 microns, and a length of from about 5 mm to about 200 mm; more particularly, the fiber diameter may be from about 2 microns to about 22 microns and the fiber length may be from about 5 mm to about 75 mm.

In some embodiments, the lofting capacity of the skin layers shown in FIGS. 6A, 6B can be further tuned by including one or more added lofting agents. The exact type of lofting agent used in the skin layers shown in FIGS. 6A, 6B can depend on numerous factors including, for example, the desired lofting temperature, the desired degree of loft, etc. In some instances, microsphere lofting agents, e.g., expandable microspheres, which can increase their size upon exposure to convection heating may be used. Illustrative commercially available lofting agents are available from Kureha Corp. (Japan). In other instances, a first lofting agent with a first average particle size and a second lofting agent with a second average particle size, different from the first average particle size, may be used in the skin layers shown in FIGS. 6A, 6B. In other examples, the lofting agent may be an expandable graphite material which can also impart some flame retardancy to the multilayer assembly.

In some configurations, the skin layers shown in FIGS. 6A, 6B may be a substantially halogen free or halogen free layer to meet the restrictions on hazardous substances requirements for certain applications. In other instances, one or more of the layers may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, trihalo- or tetra-halo-polycarbonates. In some instances, the thermoplastic material used in the skin layers shown in FIGS. 6A, 6B may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the layer), more particularly about 1 weight percent to about 13 weight percent, e.g., about 5 weight percent to about 13 weight percent. If desired, two different halogenated flame retardants may be added to the layers. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the layers may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the layer), more particularly about 1 weight percent to about 13 weight percent, e.g., about 5 weight percent to about 13 weight percent based on the weight of the layer. If desired, two different substantially halogen free flame retardants may be added to one or more of the layers described herein. In certain instances, one or more of the skin layers shown in FIGS. 6A, 6B described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the layer), more particularly about 1 weight percent to about 15 weight percent, e.g., about 2 weight percent to about 14 weight percent based on the weight of the layer. The flame retardant agents used in the layers described herein can be added to the mixture comprising the thermoplastic material and fibers (prior to disposal of the mixture on a wire screen or other processing component) or can be added after the layer is formed. In some examples, the flame retardant material may comprise one or more of expandable graphite materials, magnesium hydroxide (MDH) and aluminum hydroxide (ATM).

In certain embodiments, the skin layers shown in FIGS. 6A, 6B may comprise one or more film layers in combination with a porous fiber reinforced thermoplastic layer. For example, the film of the skin layers shown in FIGS. 6A, 6B may comprise or be a thermoplastic film, a polyolefin film, an elastomer film, etc. In certain configurations, the film comprises at least one of a polyolefin, e.g., polyethylene or polypropylene, at least one poly(ether imide), at least one poly(ether ketone), at least one poly(ether-ether ketone), at least one poly(phenylene sulfide), poly(arylene sulfone), at least one poly(ether sulfone), at least one poly(amide-imide), poly(1,4-phenylene), at least one polycarbonate, at least one nylon, and at least one silicone. In some embodiments, two or more films may be present in combination with a porous fiber reinforced thermoplastic layer for the skin layers shown in FIGS. 6A, 6B.

Figure 7A:
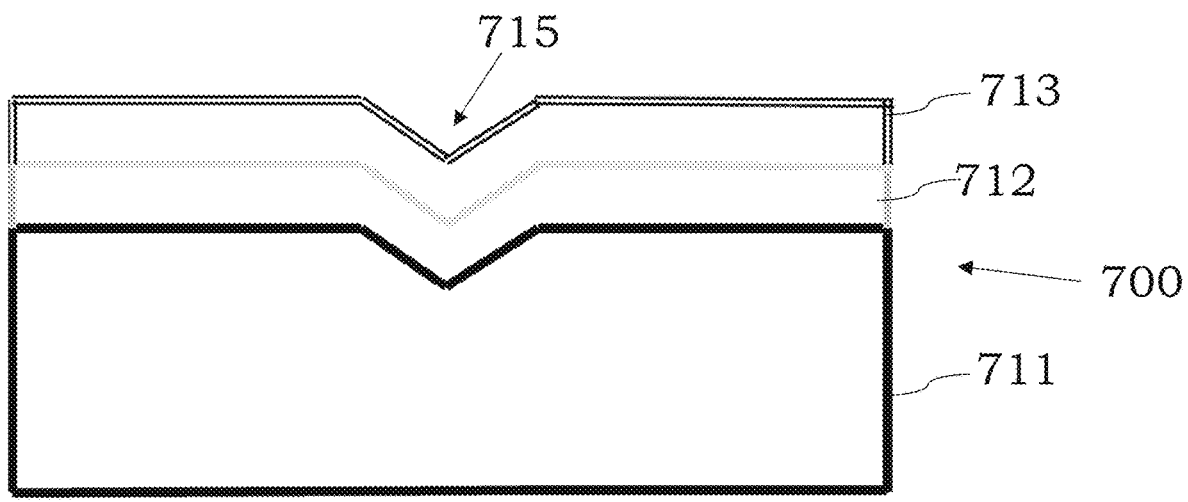
FIGS. 7A and 7B are illustrations showing a multilayer assembly that includes a core layer, a skin layer, an additional layer on the skin layer and includes depressions on at least one surface.
Figure 7B:
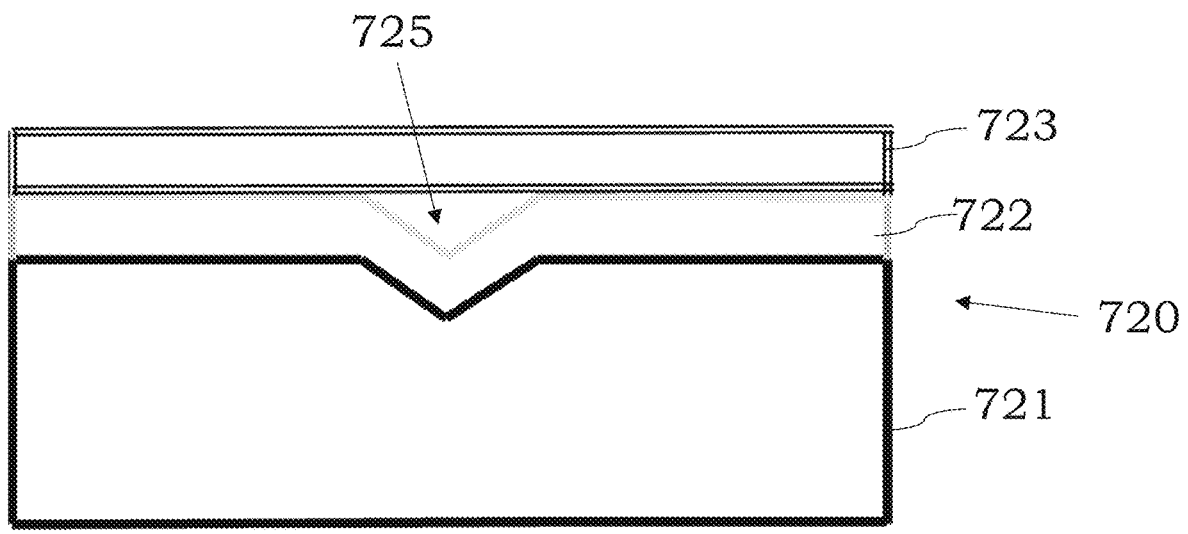

In some embodiments, a multilayer assembly may comprise a core layer, a skin layer and an additional layer. Referring to FIG. 7A, a multilayer assembly 700 is shown that includes a core layer 711, a skin layer 712 and an additional layer 7B disposed on the skin layer 712. In FIG. 7A, the additional layer 713 conforms to the skin layer 712 such that a depression 715 includes the core layer 711, the skin layer 712 and the additional layer 713. In other instances, the additional layer may have sufficient structure so it spans any depressions on the skin layer. 712 For example and referring to FIG. 7B, a multilayer assembly 720 is shown that comprises a core layer 721, a skin layer 722 and an additional layer 723 disposed on the skin layer 722. A depression 725 is shown that forms an air gap between the skin layer 722 and the additional layer 723. For example, a projection or other device, as discussed in more detail below, can be pressed into the skin layer 722 and the core layer 721 to form the depression 725. The layer 723 can then be deposited on the assembly so the layer 723 overlies the depression 725. Outward viewing of the multilayer assembly 720 would not show any depressions in the surface of the multilayer assembly 720 as the additional layer 723 can generally be planar. The presence of a skin layer 722 with depressions into a core layer 721 in combination with an additional layer 723 can enhance bonding of the skin layer 722 to the core layer 721 while still providing a generally flat or planar surface for the multilayer assembly 720. Where an additional layer is present on a skin layer as shown in FIGS. 7A and 7B, one or more surfaces of the multilayer assembly may comprise, two, three, four, five or more individual depressions each of which may include the core layer, the skin layer and optionally an additional layer. While not shown, one, two, three, four, five or more depressions can be present in any one surface of the assemblies shown in FIGS. 7A, 7B.

In certain embodiments, the core layers shown in FIGS. 7A, 7B may each comprise a honeycomb core layer such as, for example, a paper honeycomb core layer, a polyurethane layer, an expanded foam, an extruded foam, a honeycomb structure produced from one or more polymeric materials including, but not limited to, polypropylene, polyethylene, polystyrene, a polyamide, a copolyamide, polyethylene terephthalate, a polyetherimide, a polyphenylene oxide, and other polymers, a honeycomb structure produced from one or more metals including, but not limited to, aluminum, iron, steel and other metals and metal alloys. In some embodiments, the core layer may be a honeycomb layer with a material other than cellulose. For example, the honeycomb layer may be porous and include significant open space within the core layer. The core layers shown in FIGS. 7A, 7B may comprise a basis weight of about 200 grams per square meter (gsm) to about 4000 gsm. The overall thickness of the core layers shown in FIGS. 7A, 7B may vary from about 0.5 cm to about 7.5 cm. The depth of the depressions shown in the core layers FIGS. 7A, 7B can vary from about 0.125 inches (about 3 mm) to about 1 inch (about 2.5 cm), e.g., about 5 mm to about 1.25 mm, depending on the overall thickness of the core layer. As noted herein, different depressions can have different depths and/or geometries.

In certain examples, the skin layers shown in FIGS. 7A, 7B may each comprise a porous fiber reinforced thermoplastic layer. For example, the porous fiber reinforced thermoplastic layer may be configured as (or used in) a glass mat thermoplastic composite (GMT) or a light weight reinforced thermoplastic (LWRT). One such LWRT is prepared by HANWHA AZDEL, Inc. and sold under the trademark SUPERLITE® material. The areal density of such a. GMT or LWRT can range from about 300 grams per square meter (gsm) of the GMT or LWRT to about 4000 gsm, although the areal density may be less than 300 gsm or greater than 4000 gsm depending on the specific application needs. In some embodiments, the upper density can be less than about 4000 gsm. In certain instances, the GMT or the LWRT may comprise one or more lofting agent materials disposed in void space or pores of the GMT or the LWRT. Where two or more GMT or LWRT layers are present, the GMT or LWRT layers may be the same or may be different.

In certain examples where an LWRT is used as a porous fiber reinforced thermoplastic skin layer, the LWRT typically includes a thermoplastic material and a plurality of reinforcing fibers which together form a web of open celled structures. The web can be formed from a random arrangement of reinforcing fibers that are held in place by the thermoplastic material. For example, the porous fiber reinforced thermoplastic layer typically comprises a substantial amount of open cell structure such that void space is present in the layers. In some instances, the porous fiber skin layers shown in FIGS. 7A, 7B may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the skin layers shown in FIGS. 7A, 7B comprise a porosity or void content of greater than 0%, e.g., is not fully consolidated, up to about 95%. Unless otherwise stated, the reference to the skin layers shown in FIGS. 7A, 7B comprising a certain void content or porosity is based on the total volume of that skin layer and not necessarily the total volume of the multilayer assembly.

In certain examples, the skin layers shown in FIGS. 7A, 7B can be produced in the form of a GMT or LWRT sheet. In certain instances, the sheet can be generally prepared using chopped glass fibers, a thermoplastic material, optionally a lofting agent and an optional thermoplastic polymer film or films and/or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend can be used as a resin. To produce the sheet, a thermoplastic material and reinforcing materials can be added or metered into a dispersing foam contained in an open top mixing tank fitted with an impeller. Without wishing to be bound by any particular theory, the presence of trapped pockets of air of the foam can assist in dispersing the glass fibers, the thermoplastic material and the lofting agent. In some examples, the dispersed mixture of fibers and thermoplastic material can be pumped to a head-box located above a wire section of a paper machine via a distribution manifold. The foam, not the fibers and thermoplastic, can then be removed as the dispersed mixture is provided to a moving wire screen using a vacuum, continuously producing a uniform, fibrous wet web. The wet web can be passed through a dryer at a suitable temperature to reduce moisture content and to melt or soften the thermoplastic material. The resulting product may be pressed or compressed, e.g., using nip rollers or other techniques, to form a sheet which can then be coupled to a core layer or another layer.

In certain embodiments, the high porosity present in the skin layers shown in FIGS. 7A, 7B can reduce the overall weight of the multilayer assembly and can permit the inclusion of agents within the void space of the skin layers. For example, lofting agents can reside in the void space in a non-covalently bonded manner. Application of heat or other perturbations can act to increase the volume of the non-covalently bonded lofting agent which in turn increases the overall thickness of the layer, e.g., the layer increases as the size of the lofting agent increases and/or additional air becomes trapped in the layer. If desired, flame retardants, colorants, smoke suppressants and other materials may be included in the void space of the skin layers shown in FIGS. 7A, 7B. Prior to lofting, the multilayer assembly can be compressed to reduce its overall thickness, e.g., compressed before or after the layer is coupled to one or more other layers.

In certain embodiments, the thermoplastic material of the skin layers shown in FIGS. 7A, 7B may comprise, at least in part, a polyolefin or one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, co-polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as copolymers, alloys and blends of these materials with each other or other polymeric materials. The thermoplastic material used to form the skin layers shown in FIGS. 7A, 7B can be used in powder form, resin form, rosin form, particle form, fiber form or other suitable forms. Illustrative thermoplastic materials in various forms are described herein and are also described, for example in U.S. Publication Nos. 20130244528 and US20120065283. The exact amount of thermoplastic material present in the skin layers shown in FIGS. 7A, 7B can vary and illustrative amounts range from about 20% by weight to about 80% by weight, e.g., 30-70 percent by weight or 35-65 percent by weight. It will be recognized by the skilled person that the weight percentages of all materials used in any one of the skin layers shown in FIGS. 7A, 7B will add to 100 weight percent.

In certain examples, the reinforcing fibers of the skin layers shown in FIGS. 7A, 7B may comprise glass fibers, carbon fibers, graphite fibers, synthetic organic fibers, particularly high modulus organic fibers such as, for example, para- and meta-aramid fibers, nylon fibers, polyester fibers, or high melt flow index resins that are suitable for use as fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material, the lofting agent or both. The fiber content in the skin layers shown in FIGS. 7A, 7B may independently be from about 20% to about 90% by weight of the layer, more particularly from about 30% to about 70%, by weight of the layer. Typically, the fiber content of a multilayer assembly comprising the skin layers shown in FIGS. 7A, 7B varies between about 20% to about 90% by weight, more particularly about 30% by weight to about 80% by weight, e.g., about 40% to about 70% by weight of the assembly. The particular size and/or orientation of the fibers used may depend, at least in part, on the thermoplastic polymer material used and/or the desired properties of the skin layers shown in FIGS. 7A, 7B. Suitable additional types of fibers, fiber sizes and amounts will be readily selected by the person of ordinary skill in the art, given the benefit of this disclosure. In one non-limiting illustration, fibers dispersed within a thermoplastic material and optionally a lofting agent to provide the skin layers shown in FIGS. 7A, 7B can generally have a diameter of greater than about 5 microns, more particularly from about 5 microns to about 22 microns, and a length of from about 5 mm to about 200 mm; more particularly, the fiber diameter may be from about 2 microns to about 22 microns and the fiber length may be from about 5 mm to about 75 mm.

In some embodiments, the lofting capacity of the skin layers shown in FIGS. 7A, 7B can be further tuned by including one or more added lofting agents. The exact type of lofting agent used in the skin layers shown in FIGS. 7A, 7B can depend on numerous factors including, for example, the desired lofting temperature, the desired degree of loft, etc. In some instances, microsphere lofting agents, e.g., expandable microspheres, which can increase their size upon exposure to convection heating may be used. Illustrative commercially available lofting agents are available from Kureha Corp. (Japan). In other instances, a first lofting agent with a first average particle size and a second lofting agent with a second average particle size, different from the first average particle size, may be used in the skin layers shown in FIGS. 7A, 7B. In other examples, the lofting agent may be an expandable graphite material which can also impart some flame retardancy to the multilayer assembly.

In some configurations, the skin layers shown in FIGS. 7A, 7B may be a substantially halogen free or halogen free layer to meet the restrictions on hazardous substances requirements for certain applications. In other instances, one or more of the layers may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, trihalo- or tetra-halo-polycarbonates. In some instances, the thermoplastic material used in the skin layers shown in FIGS. 7A, 7B may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the layer), more particularly about 1 weight percent to about 13 weight percent, e.g., about 5 weight percent to about 13 weight percent. If desired, two different halogenated flame retardants may be added to the layers. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the layers may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the layer), more particularly about 1 weight percent to about 13 weight percent, e.g., about 5 weight percent to about 13 weight percent based on the weight of the layer. If desired, two different substantially halogen free flame retardants may be added to one or more of the layers described herein. In certain instances, one or more of the skin layers shown in FIGS. 7A, 7B described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the layer), more particularly about 1 weight percent to about 15 weight percent, e.g., about 2 weight percent to about 14 weight percent based on the weight of the layer. The flame retardant agents used in the layers described herein can be added to the mixture comprising the thermoplastic material and fibers (prior to disposal of the mixture on a wire screen or other processing component) or can be added after the layer is formed. In some examples, the flame retardant material may comprise one or more of expandable graphite materials, magnesium hydroxide (MDH) and aluminum hydroxide (ATM).

In certain embodiments, the skin layers shown in FIGS. 7A, 7B may comprise one or more film layers in combination with a porous fiber reinforced thermoplastic layer. For example, the film of the skin layers shown in FIGS. 7A, 7B may comprise or be a thermoplastic film, a polyolefin film, an elastomer film, etc. In certain configurations, the film comprises at least one of a polyolefin, e.g., polyethylene or polypropylene, at least one poly(ether imide), at least one poly(ether ketone), at least one poly(ether-ether ketone), at least one poly(phenylene sulfide), poly(arylene sulfone), at least one poly(ether sulfone), at least one poly(amide-imide), poly(1,4-phenylene), at least one polycarbonate, at least one nylon, and at least one silicone. In some embodiments, two or more films may be present in combination with a porous fiber reinforced thermoplastic layer for the skin layers shown in FIGS. 7A, 7B.

In certain embodiments, the additional layers shown in FIGS. 7A, 7B may include a film (e.g., thermoplastic film or elastomeric film), a frim, a scrim (e.g., fiber based scrim or a scrim comprising hydrophilic fibers such as cellulose based fibers), a foil, a woven fabric, a non-woven fabric or be present as an inorganic coating, an organic coating, or a thermoset coating. In other instances, the additional layer shown in FIGS. 7A, 7B may comprise a limiting oxygen index greater than about 22, as measured per ISO 4589 dated 1996. Where a thermoplastic film is present as (or as part of) the additional layer shown in FIGS. 7A, 7B, the thermoplastic film may comprise at least one of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as (or as part of) the additional layer shown in FIGS. 7A, 7B, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the additional layer shown in FIGS. 7A, 7B, the coating may comprise at least one of unsaturated polyurethanes, vinyl esters, phenolics and epoxies. Where an inorganic coating is present as (or as part of) the additional layer shown in FIGS. 7A, 7B, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the additional layer shown in FIGS. 7A, 7B, the non-woven fabric may comprise a thermoplastic material, a thermal setting binder, inorganic fibers, metal fibers, metallized inorganic fibers and metallized synthetic fibers. If desired, the additional layer shown in FIGS. 7A, 7B may comprise an expandable graphite material, a flame retardant material, fibers, etc.

Figure 8A:
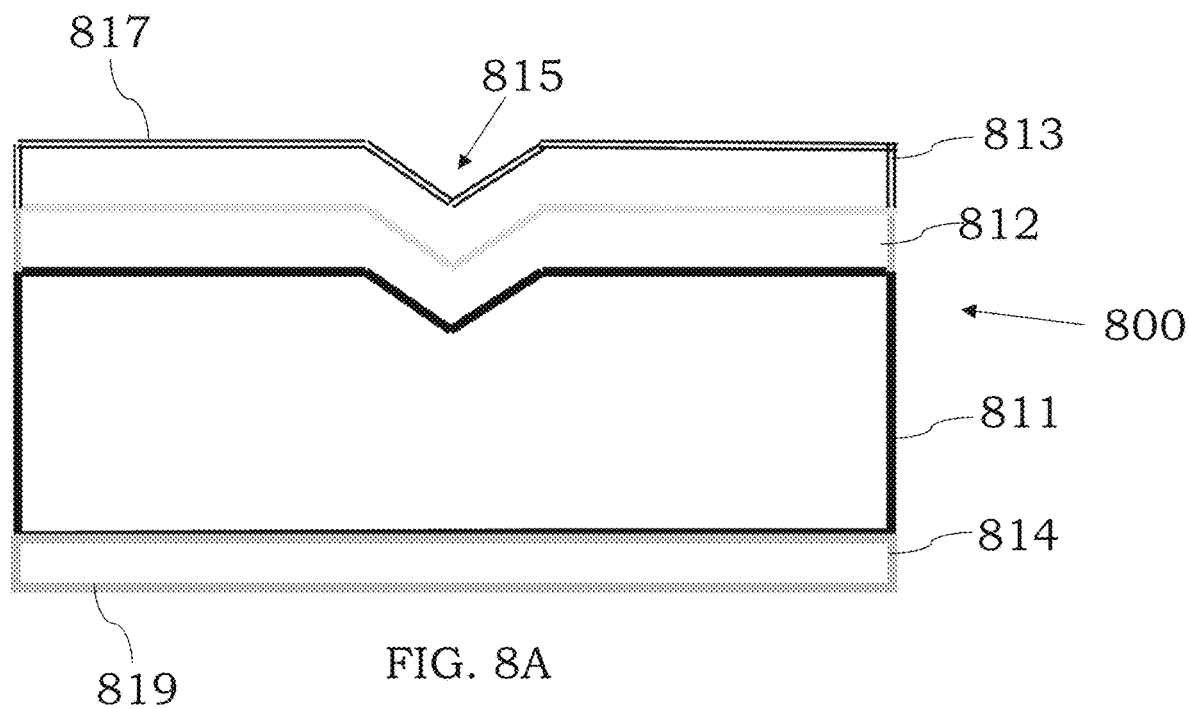
FIGS. 8A and 8B are illustrations showing a multilayer assembly that includes a core layer, two skin layers, an additional layer on one of the skin layers and includes depressions on at least one surface.
Figure 8B:
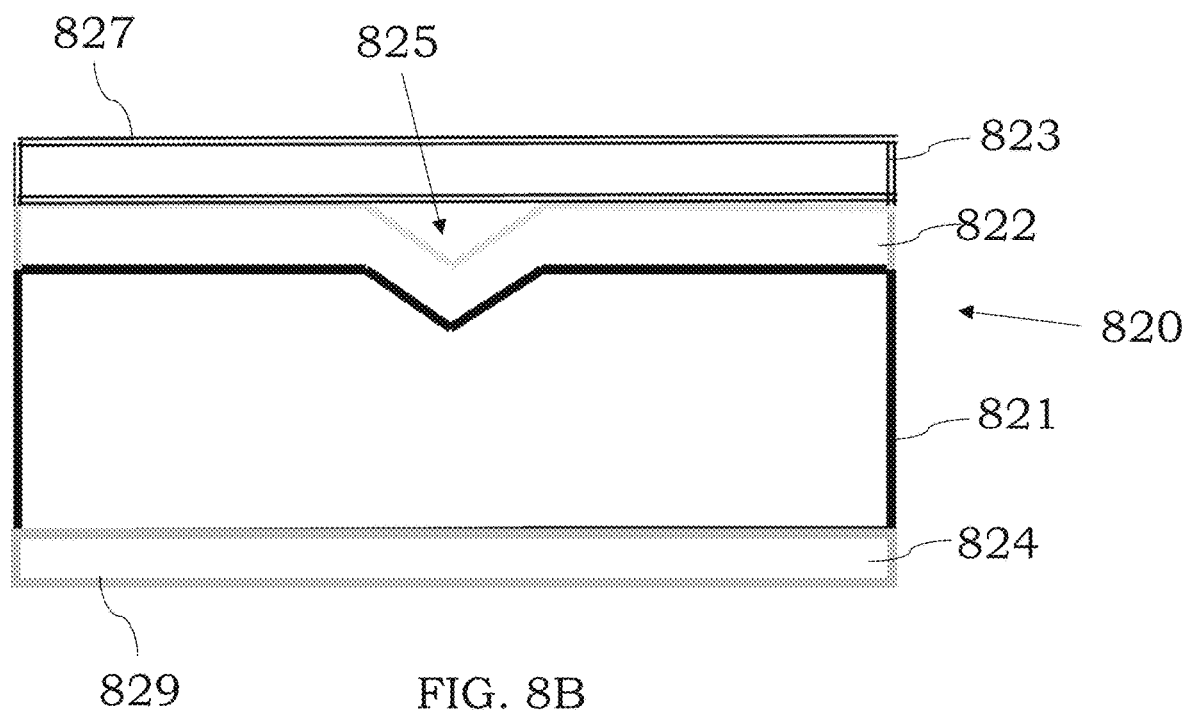

In certain embodiments, an additional layer may be present on a second surface of a core layer as shown in FIGS. 8A and 8B. FIG. 8A shows a multilayer assembly 800 including a core layer 811, skin layers 812, 814 and an additional layer 813. A depression 815 is present on one surface of the assembly 800, though if desired two, three, four, five or more depressions may be present on one or more surfaces of the multilayer assembly. For example, a plurality of depressions may be present on the surface 817 and/or on the surface 819. While not shown, an additional layer may also be present on the surface 819 if desired.

In some examples, the additional layer may have sufficient structure so it spans any depressions on the skin layer. For example and referring to FIG. 8B, a multilayer assembly 820 is shown that comprises a core layer 821, skin layers 822, 824 and an additional layer 823 disposed on the skin layer 822. A depression 825 is shown that forms an air gap between the skin layer 822 and the additional layer 823. For example, a projection or other device can be pressed into the skin layer 822 and the core layer 821 to form the depression 825. The layer 823 can then be deposited on the assembly so the layer 823 overlies the depression 825. Outward viewing of the multilayer assembly 820 would not show any depressions in the surface of the multilayer assembly 820 as the additional layer 823 can generally be planar. The presence of a skin layer 822 with depressions into a core layer 821 in combination with an additional layer 823 can enhance bonding of the skin layer 822 to the core layer 821 while still providing a generally flat or planar surface for the multilayer assembly 820. If desired two, three, four, five or more depressions may be present on one or more surfaces of the multilayer assembly. For example, a plurality of depressions may be present on the surface 827 and/or on the surface 829. While not shown, an additional layer may also be present on the surface 829 if desired.

In certain embodiments, the core layers shown in FIGS. 8A, 8B may each comprise a honeycomb core layer such as, for example, a paper honeycomb core layer, a polyurethane layer, an expanded foam, an extruded foam, a honeycomb structure produced from one or more polymeric materials including, but not limited to, polypropylene, polyethylene, polystyrene, a polyamide, a copolyamide, polyethylene terephthalate, a polyetherimide, a polyphenylene oxide, and other polymers, a honeycomb structure produced from one or more metals including, but not limited to, aluminum, iron, steel and other metals and metal alloys. In some embodiments, the core layer may be a honeycomb layer with a material other than cellulose. For example, the honeycomb layer may be porous and include significant open space within the core layer. The core layers shown in FIGS. 8A, 8B may comprise a basis weight of about 200 grams per square meter (gsm) to about 4000 gsm. The overall thickness of the core layers shown in FIGS. 8A, 8B may vary from about 0.5 cm to about 7.5 cm. The depth of the depressions shown in the core layers FIGS. 8A, 8B can vary from about 0.125 inches (about 3 mm) to about 1 inch (about 2.5 cm), e.g., about 5 mm to about 1.25 mm, depending on the overall thickness of the core layer. As noted herein, different depressions can have different depths and/or geometries.

In certain examples, the skin layers shown in FIGS. 8A, 8B may each comprise a porous fiber reinforced thermoplastic layer. For example, the porous fiber reinforced thermoplastic layer may be configured as (or used in) a glass mat thermoplastic composite (GMT) or a light weight reinforced thermoplastic (LWRT). One such LWRT is prepared by HANWHA AZDEL, Inc. and sold under the trademark SUPERLITE® material. The areal density of such a GMT or LWRT can range from about 300 grams per square meter (gsm) of the GMT or LWRT to about 4000 gsm, although the areal density may be less than 300 gsm or greater than 4000 gsm depending on the specific application needs. In some embodiments, the upper density can be less than about 4000 gsm. In certain instances, the GMT or the LWRT may comprise one or more lofting agent materials disposed in void space or pores of the GMT or the LWRT. Where two or more GMT or LWRT layers are present, the GMT or LWRT layers may be the same or may be different.

In certain examples where an LWRT is used as a porous fiber reinforced thermoplastic skin layer, the LWRT typically includes a thermoplastic material and a plurality of reinforcing fibers which together form a web of open celled structures. The web can be formed from a random arrangement of reinforcing fibers that are held in place by the thermoplastic material. For example, the porous fiber reinforced thermoplastic layer typically comprises a substantial amount of open cell structure such that void space is present in the layers. In some instances, the porous fiber skin layers shown in FIGS. 8A, 8B may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the skin layers shown in FIGS. 8A, 8B comprise a porosity or void content of greater than 0%, e.g., is not fully consolidated, up to about 95%. Unless otherwise stated, the reference to the skin layers shown in FIGS. 8A, 8B comprising a certain void content or porosity is based on the total volume of that skin layer and not necessarily the total volume of the multilayer assembly.

In certain examples, the skin layers shown in FIGS. 8A, 8B can be produced in the form of a GMT or LWRT sheet. In certain instances, the sheet can be generally prepared using chopped glass fibers, a thermoplastic material, optionally a lofting agent and an optional thermoplastic polymer film or films and/or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend can be used as a resin. To produce the sheet, a thermoplastic material and reinforcing materials can be added or metered into a dispersing foam contained in an open top mixing tank fitted with an impeller. Without wishing to be bound by any particular theory, the presence of trapped pockets of air of the foam can assist in dispersing the glass fibers, the thermoplastic material and the lofting agent. In some examples, the dispersed mixture of fibers and thermoplastic material can be pumped to a head-box located above a wire section of a paper machine via a distribution manifold. The foam, not the fibers and thermoplastic, can then be removed as the dispersed mixture is provided to a moving wire screen using a vacuum, continuously producing a uniform, fibrous wet web. The wet web can be passed through a dryer at a suitable temperature to reduce moisture content and to melt or soften the thermoplastic material. The resulting product may be pressed or compressed, e.g., using nip rollers or other techniques, to form a sheet which can then be coupled to a core layer or another layer.

In certain embodiments, the high porosity present in the skin layers shown in FIGS. 8A, 8B can reduce the overall weight of the multilayer assembly and can permit the inclusion of agents within the void space of the skin layers. For example, lofting agents can reside in the void space in a non-covalently bonded manner. Application of heat or other perturbations can act to increase the volume of the non-covalently bonded lofting agent which in turn increases the overall thickness of the layer, e.g., the layer increases as the size of the lofting agent increases and/or additional air becomes trapped in the layer. If desired, flame retardants, colorants, smoke suppressants and other materials may be included in the void space of the skin layers shown in FIGS. 8A, 8B. Prior to lofting, the multilayer assembly can be compressed to reduce its overall thickness, e.g., compressed before or after the layer is coupled to one or more other layers.

In certain embodiments, the thermoplastic material of the skin layers shown in FIGS. 8A, 8B may comprise, at least in part, a polyolefin or one or more of polyethylene, polypropylene, polystyrene, acrylonitiyistyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, co-polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's AMC® PC, high temperature nylon, and silicones, as well as copolymers, alloys and blends of these materials with each other or other polymeric materials. The thermoplastic material used to form the skin layers shown in FIGS. 8A, 8B can be used in powder form, resin form, rosin form; particle form, fiber form or other suitable forms. Illustrative thermoplastic materials in various forms are described herein and are also described, for example in U.S. Publication Nos. 20130244528 and US20120065283. The exact amount of thermoplastic material present in the skin layers shown in FIGS. 8A, 8B can vary and illustrative amounts range from about 20% by weight to about 80% by weight, e.g., 30-70 percent by weight or 35-65 percent by weight. It will be recognized by the skilled person that the weight percentages of all materials used in any one of the skin layers shown in FIGS. 8A, 8B will add to 100 weight percent.

In certain examples, the reinforcing fibers of the skin layers shown in FIGS. 8A, 8B may comprise glass fibers, carbon fibers, graphite fibers, synthetic organic fibers, particularly, high modulus organic fibers such as, for example, para- and meta-aramid fibers, nylon fibers, polyester fibers, or high melt flow index resins that are suitable for use as fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material, the lofting agent or both. The fiber content in the skin layers shown in FIGS. 8A, 8B may independently be from about 20% to about 90% by weight of the layer, more particularly from about 30% to about 70%, by weight of the layer. Typically, the fiber content of a multilayer assembly comprising the skin layers shown in FIGS. 8A, 8B varies between about 20% to about 90% by weight, more particularly about 30% by weight to about 80% by weight, e.g., about 40% to about 70% by weight of the assembly. The particular size and/or orientation of the fibers used may depend, at least in part, on the thermoplastic polymer material used and/or the desired properties of the skin layers shown in FIGS. 8A, 8B. Suitable additional types of fibers, fiber sizes and amounts will be readily selected by the person of ordinary-skill in the art, given the benefit of this disclosure. In one non-limiting illustration, fibers dispersed within a thermoplastic material and optionally a lofting agent to provide the skin layers shown in FIGS. 8A, 8B can generally have a diameter of greater than about 5 microns, more particularly from about 5 microns to about 22 microns, and a length of from about 5 mm to about 200 ram; more particularly, the fiber diameter may be from about 2 microns to about 22 microns and the fiber length may be from about 5 mm to about 75 mm.

In some embodiments, the lofting capacity of the skin layers shown in FIGS. 8A, 8B can be further tuned by including one or more added lofting agents. The exact type of lofting agent used in the skin layers shown in FIGS. 8A, 8B can depend on numerous factors including, for example, the desired lofting temperature, the desired degree of loft, etc. In some instances, microsphere lofting agents, e.g., expandable microspheres, which can increase their size upon exposure to convection heating may be used. Illustrative commercially available lofting agents are available from Kureha. Corp. (Japan). In other instances, a first lofting agent with a first average particle size and a second lofting agent with a second average particle size, different from the first average particle size, may be used in the skin layers shown in FIGS. 8A, 8B. In other examples, the lofting agent may be an expandable graphite material which can also impart some flame retardancy to the multilayer assembly.

In some configurations, the skin layers shown in FIGS. 8A, 8B may be a substantially halogen free or halogen free layer to meet the restrictions on hazardous substances requirements for certain applications. In other instances, one or more of the layers may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the skin layers shown in FIGS. 8A, 8B may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the layer), more particularly about 1 weight percent to about 13 weight percent, e.g., about 5 weight percent to about 13 weight percent. If desired, two different halogenated flame retardants may be added to the layers. In other instances, a non-halogenated flame retardant agent such as, for example, a flame retardant agent comprising one or more of N, P, As, Sb. Bi, S, Se, and Te can be added. In some embodiments, the non-halogenated flame retardant may comprise a phosphorated material so the layers may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the layer), more particularly about 1 weight percent to about 13 weight percent, e.g., about 5 weight percent to about 13 weight percent based on the weight of the layer. If desired, two different substantially halogen free flame retardants may be added to one or more of the layers described herein. In certain instances, one or more of the skin layers shown in FIGS. 8A, 8B described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the layer), more particularly about 1 weight percent to about 15 weight percent, e.g., about 2 weight percent to about 14 weight percent based on the weight of the layer. The flame retardant agents used in the layers described herein can be added to the mixture comprising the thermoplastic material and fibers (prior to disposal of the mixture on a wire screen or other processing component) or can be added after the layer is formed. In some examples, the flame retardant material may comprise one or more of expandable graphite materials, magnesium hydroxide (NIDI) and aluminum hydroxide (ATH).

In certain embodiments, the skin layers shown in FIGS. 8A, 8B may comprise one or more film layers in combination with a porous fiber reinforced thermoplastic layer. For example, the film of the skin layers shown in FIGS. 8A, 8B may comprise or be a thermoplastic film, a polyolefin film, an elastomer film, etc. In certain configurations, the film comprises at least one of a polyolefin, e.g., polyethylene or polypropylene, at least one poly(ether imide), at least one poly(ether ketone), at least one poly(ether-ether ketone), at least one poly(phenylene sulfide), poly(arylene sulfone), at least one poly(ether sulfone), at least one poly(amide-imide), poly(1,4-phenylene), at least one polycarbonate, at least one nylon, and at least one silicone. In some embodiments, two or more films may be present in combination with a porous fiber reinforced thermoplastic layer for the skin layers shown in FIGS. 8A, 8B.

In certain embodiments, the additional layers shown in FIGS. 8A, 8B may include a film (e.g., thermoplastic film or elastomeric film), a frim, a scrim (e.g., fiber based scrim or a scrim comprising hydrophilic fibers such as cellulose based fibers), a foil, a woven fabric, a non-woven fabric or be present as an inorganic coating, an organic coating, or a thermoset coating. In other instances, the additional layer shown in FIGS. 8A, 8B may comprise a limiting oxygen index greater than about 22, as measured per ISO 4589 dated 1996. Where a thermoplastic film is present as (or as part of) the additional layer shown in FIGS. 8A, 8B, the thermoplastic film may comprise at least one of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as (or as part of) the additional layer shown in FIGS. 8A, 8B, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the additional layer shown in FIGS. 8A, 8B, the coating may comprise at least one of unsaturated polyurethanes, vinyl esters, phenolics and epoxies. Where an inorganic coating is present as (or as part of) the additional layer shown in FIGS. 8A, 8B, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the additional layer shown in FIGS. 8A, 8B, the non-woven fabric may comprise a thermoplastic material, a thermal setting binder, inorganic fibers, metal fibers, metallized inorganic fibers and metallized synthetic fibers. If desired, the additional layer shown in FIGS. 8A, 8B may comprise an expandable graphite material, a flame retardant material, fibers, etc.

In some examples, one or more intervening layers may be present between a core layer and a skin layer. Referring to FIG. 9, an intervening layer 920 is shown between a core layer 910 and a skin layer 930. The intervening layer 920 may be for example, an adhesive layer, a powder coat layer, a film, or other materials. While not shown, one or more additional layers can also be present on a second surface 904 of the core layer 910. Further, the second surface 904 may also comprise one, two, three, four, five or more depressions if desired. The core layer 910 and the skin layer 930 may comprise any of these materials described in reference, for example, to FIGS. 8A and 8B.

In certain examples, it may be desirable to pre-form a skin layer with one or more depressions in the skin layer. The one or more depressions in the skin layer can mirror depressions in a core layer so the skin layer and core layer can be placed together. For example, a projection, press or other device, as discussed in more detail below, can be used to create depressions in a skin layer. These depressions can then be coupled to depressions in a core layer by matching up the various depressions. By mirroring the depressions in a skin layer and a core layer, the skin layer can be coupled to the core layer in a desired orientation. For example, where the skin layer has a specific arrangement of fibers, it may be desirable to orient the fibers in either the machine direction or the cross direction. By creating an asymmetric or unique arrangement of depressions in a skin layer and a core layer, the skin layer and the core layer can be coupled to each other in a specific direction.

In certain embodiments, the depressions described herein can be produced in many different ways. For example and referring to FIG. 10, a spike 1010 on a plate 1000 is shown. The spike 1010 can be pressed into the core layer, the skin layer or both to create a depression. The exact depth at which the spike is pressed into the layers may vary from about ⅛ inches (about 30 mm) to inches (about 1.25 cm). If desired, the depth can be adjusted either by pushing the spike 1010 further into the layers or by increasing a length of the spike 1010. The spike 1010 may take many different forms and shapes and may have a sharp end or a rounded end, may be solid, may be hollow, may have two or more different projections or may take other forms. The spike 1010 typically comprises a material with a higher melting point than the materials used in the skin layer. For example, the spike 1010 may comprise a metal, high temperature polymer, rubber, carbon fiber, diamond or other materials with a melting point above 200 degrees Celsius, 250 degrees Celsius or above 300 degrees Celsius. If desired, the spike 1010 can be coated with materials such as, for example, an adhesive, a powder, a dye, a flame retardant, particles, a resin, a rosin, fibers or other materials. In some instances, the spike 1010 may comprise a non-stick coating, e.g., a fluoropolymer or other materials, so the core layer and skin layer do not stick to the spike during production of the multilayer assembly.

In certain embodiments, the spike may be present in a plate along with one or more other spikes. For example and referring to FIG. 11, a plate 1100 is shown that comprises a plurality of spikes (collectively 1110) each of which has an independently adjustable depth. The depth of the spikes 1110 can be the same or can be different to provide depressions of different depths. Further, the dimensions and shapes of the spikes also need not be the same. The spikes 1110 may include any of those configurations and materials described in connection with spike 1010.

Figure 12:
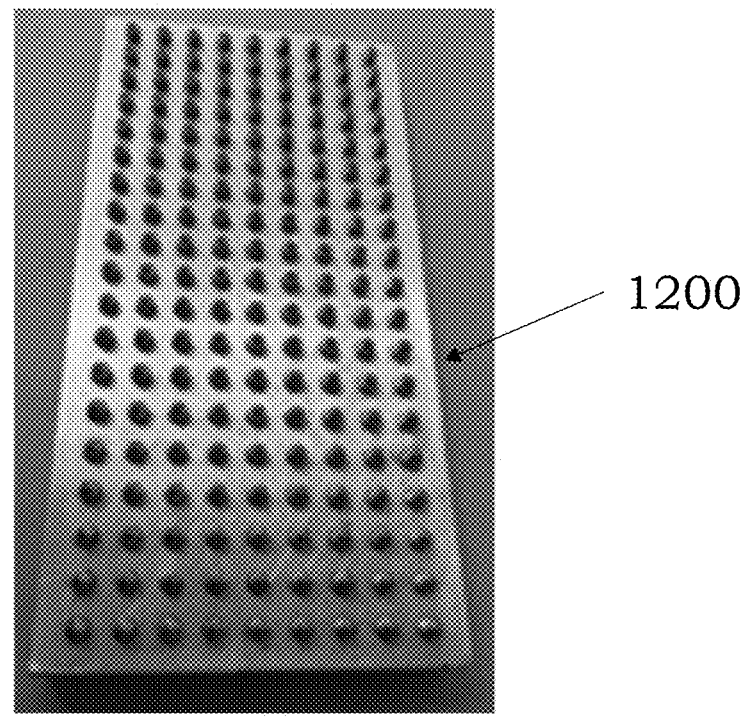
FIG. 12 is a photograph of a plate comprising a plurality of projections, in accordance with some embodiments.

In some examples, a plate comprising a plurality of projections can be pressed into a surface of a multilayer assembly to provide a plurality of depressions. Referring to FIG. 12, a plate 1200 is shown that comprises nine projections per row with nineteen individual rows totaling 171 individual projections. The exact number of projections per row may be one, two, three or more. Similarly, the number of rows present on a plate may be one, two, three or more. The individual projections in each row can be symmetrically or asymmetrically spaced apart from each other as desired. Further, the shape, size and/or depth of different projections need not be the same. In use of the plate 1200, a skin layer can be placed on a core layer and heated to soften the skin layer and/or the core layer. The plate 1200 can then be pressed into the softened skin layer to create a plurality of depressions across the surface of the skin layer.

In certain examples, while the projections are shown in FIG. 12 as being fixed, if desired, one or more of the projections can be actuated, e.g., hydraulically, pneumatically, etc. to push the projection into the skin layer. For example, the plate may be placed adjacent to a skin layer and remain stationary. One or more individual projections can be actuated to push that projection into the skin layer and/or core layer to create a depression.

In certain configurations, a softened skin layer can be placed adjacent to a plurality of air jets to form depressions in a first surface of the multilayer assembly. For example, application of pneumatic pressure, e.g., either continuously or intermittently, from air jets can act to push the skin layer into the core layer and form one or more depressions. Different air pressures can be used if desired to form depressions with different depths and/or shapes. Ambient air, an inert gas such as nitrogen or helium or other gases may be used to form the depressions. In some instances, a reactive gas can be used so the fibers and/or thermoplastic materials present in the skin layer can react with the materials in the reactive gas.

In certain examples, the core layers described herein can be produced by extruding or expanding foams or by producing honeycomb structures by joining multiple strips of material and/or cutting the material to a determined thickness and height. These strips can, for example, be attached glue/welded) at a determined spacing. When pulled open the cells can provide a honeycomb structure. For example, in one instance a paper roll can be used to provide a series of stacked sheets, which can be connected with an adhesive in certain areas. The stacked sheets can then be sliced. The slices can be expanded to provide a core with a plurality of cells or honeycombs. In the case of metal honeycomb structures, they can be printed, forged, cast or otherwise produced.

In producing the skin layers described herein, it may be desirable to use a wet-laid process and one or more additional materials. For example, a liquid or fluid medium comprising dispersed material, e.g., thermoplastic material and one or more types of reinforcing materials such as fibers, etc., optionally with any one or more additives described herein (e.g., flame retardant agents, lofting agents, etc.), may be stirred or agitated in the presence of a gas, e.g., air or other gas. The dispersion may then be laid onto a moving support, e.g., a wire screen or other support material, to provide a substantially uniform distribution of the materials in the laid down material. To increase material dispersion and/or uniformity, the stirred dispersion may comprise one or more active agents, e.g., anionic, cationic, or non-ionic such as, for example, those sold under the name ACE liquid by Industrial Soaps Ltd., that sold as TEXOFOR® FN 15 material, by Glover Chemicals Ltd., and those sold as AMINE Fb 19 material by Float-Ore Ltd. These agents can assist in dispersal of air in the liquid dispersion. The components can be added to a mixing tank, flotation cell or other suitable devices in the presence of air to provide the dispersion. While an aqueous dispersion is desirably used, one or more non-aqueous fluids may also be present to assist in dispersion, alter the viscosity of the fluid or otherwise impart a desired physical or chemical property to the dispersion or the prepreg, core or article.

In certain instances, after the dispersion has been mixed for a sufficient period, the fluid with the suspended materials can be disposed onto a screen, moving wire or other suitable support structure to provide a web of laid down material. Suction or reduced pressure may be provided to the web to remove any liquid from laid down material to leave behind the thermoplastic material, and any other materials that are present, e.g., fibers, additives, etc. The resulting web can be dried and optionally consolidated or pressed to a desired thickness prior to fully forming it to provide a desired skin layer. While wet laid processes may be used, depending on the nature of the thermoplastic material and reinforcing materials, it may be desirable to instead use an air laid process, a dry blend process, a carding and needle process, or other known process that are employed for making non-woven products.

In certain embodiments, the skin layers described herein can be produced using an inline process and/or an inline system. For example, a system to produce a skin layer can include a head box that can be used to mix the materials and deposit a liquid comprising thermoplastic material (TP) and reinforcing materials (RM) on a moving support. The moving support can be moved using pulleys or rollers which can be coupled to a motor. A vacuum device can be present to remove liquid, but not the TP or RM, from the deposited materials on the moving support to form a web. The web can be permitted to solidify or be dried for at least some period before being provided to an optional set of rollers to compress the web. A moving belt can receive the dried web from the moving support. The gap between the moving support and the belt can be small so the dried web does not fall through.

In certain examples, the web can then be placed on a core layer and heated to a desired temperature to soften the web, e.g., 170-240 degrees Celsius. The exact time used to heat the web may vary from a few seconds up to a few minutes depending on the overall thickness of the dried web. A plate, mold, etc. comprising projections can then be pressed into the heated web on the core layer to form one or more depressions to enhance bonding of the skin layer to the sidewalls of the core layer that are formed from pushing the projections into the multilayer assembly.

In certain embodiments, the multilayer assembly can be placed in a mold optionally, with other layers that can be coupled to the multilayer assembly. The walls of the mold can include projections to provide depressions in the final assembly after molding. As the mold is heated, e.g., to 300 degrees Celsius or above, the assembly can be shaped into a desired final article while at the same time producing the depressions to enhance bonding of the skin layer to the core layer.

In certain embodiments, an inflatable bladder with projections can be used with or without the mold to produce the depressions in the surface of the assemblies described herein. The inflatable bladder may be made of a high temperature material to soften one or more layers of the assembly to permit pressing of the dimples or depressions into the surface(s) of the assembly.

In certain embodiments, an overall thickness, weight, etc. of the multilayer assemblies can vary. In some examples, a thickness of the multilayer assembly may vary. In some examples, for load floors in automotive applications, the load floor may have an effective basis weight so less than 4 mm deflection occurs when a load up to 125 lbs (~57 kg) is placed on the floor. In other instances, the multilayer assembly may have an effective basis weight so less than 8 mm of deflection occurs when a load up to 500 lbs (~227 kg) is placed on the floor. Applications with higher weight support requirements could have higher basis weights as desired.

In certain embodiments, the multilayer assemblies described herein can be used in vehicles, e.g., automobiles, trucks, trains, planes, etc., in recreational vehicles, e.g., tow behind RV's, Class A RV's, Class B RV's, Class C's RVs, truck campers, toy haulers, RV trailers or other recreational vehicles, in building applications, e.g., siding, ceilings, wall cubicles, flooring, wall boards or in other applications.

Figure 13A:
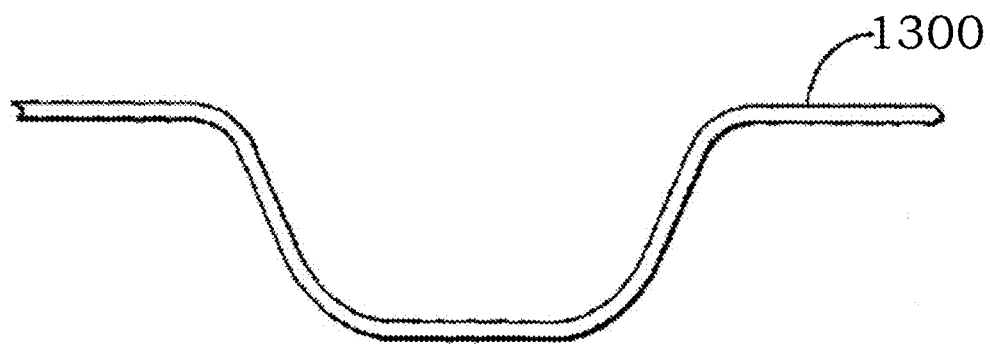
FIG. 13A is an illustration of a load floor, in accordance with certain embodiments.

In certain embodiments, a load floor 1300 is shown in FIG. 13A. A side view of a load floor that can be used as a vehicle load floor is shown. The load floor 1300 is typically, positioned in the rear portion of the vehicle, e.g., a rear storage portion of a sport utility vehicle or minivan, and is designed to receive components, gear, luggage, a spare tire, etc. for storage. A lid or covering (not shown) may also be present to enclose the components within the vehicle load floor 1300 and shield them from view. The load floor 1300 may comprise, for example, a multilayer assembly comprising one or more depression as described herein. In some instances, the load floor 1300 provides sufficient weight bearing capacity, e.g., about 50 pounds or more (about 22 kg or more or the ability to withstand at least 220 Newtons of force) so that no underlying support members from the vehicle need be present to support it.

Figure 13B:
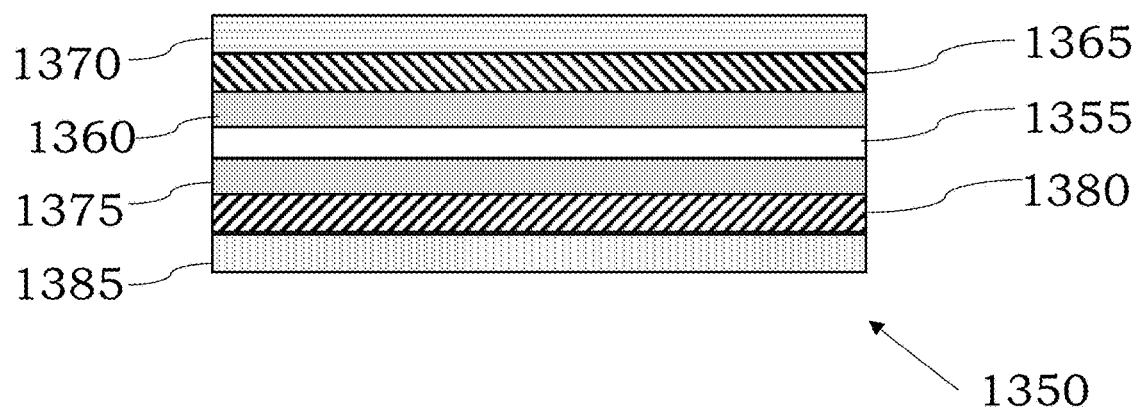
FIG. 13B is another illustration of a load floor, in accordance with certain examples.

In certain examples, a load floor may have a layered construction as described herein in connection with FIGS. 1A-8B. In some examples, the load floor may comprise a layered arrangement as shown in FIG. 13B. The load floor 1350 includes a honeycomb layer 1355. On a first surface of the layer 1355 is an optional adhesive layer 1360. A first fiber reinforced thermoplastic layer 1365 can be present on the adhesive layer 1360. A skin, decorative layer or scrim 1370 can be present on the layer 1365. Another optional adhesive layer 1375 can be present on a second surface of the honeycomb layer 1355. A second fiber reinforced thermoplastic layer 1380 can be present on the layer 1375. A skin, scrim or decorative layer 1385 can be present on the layer 1380. Depressions (not shown) can be present on or in one of more or the surfaces as noted herein.

Figure 14:
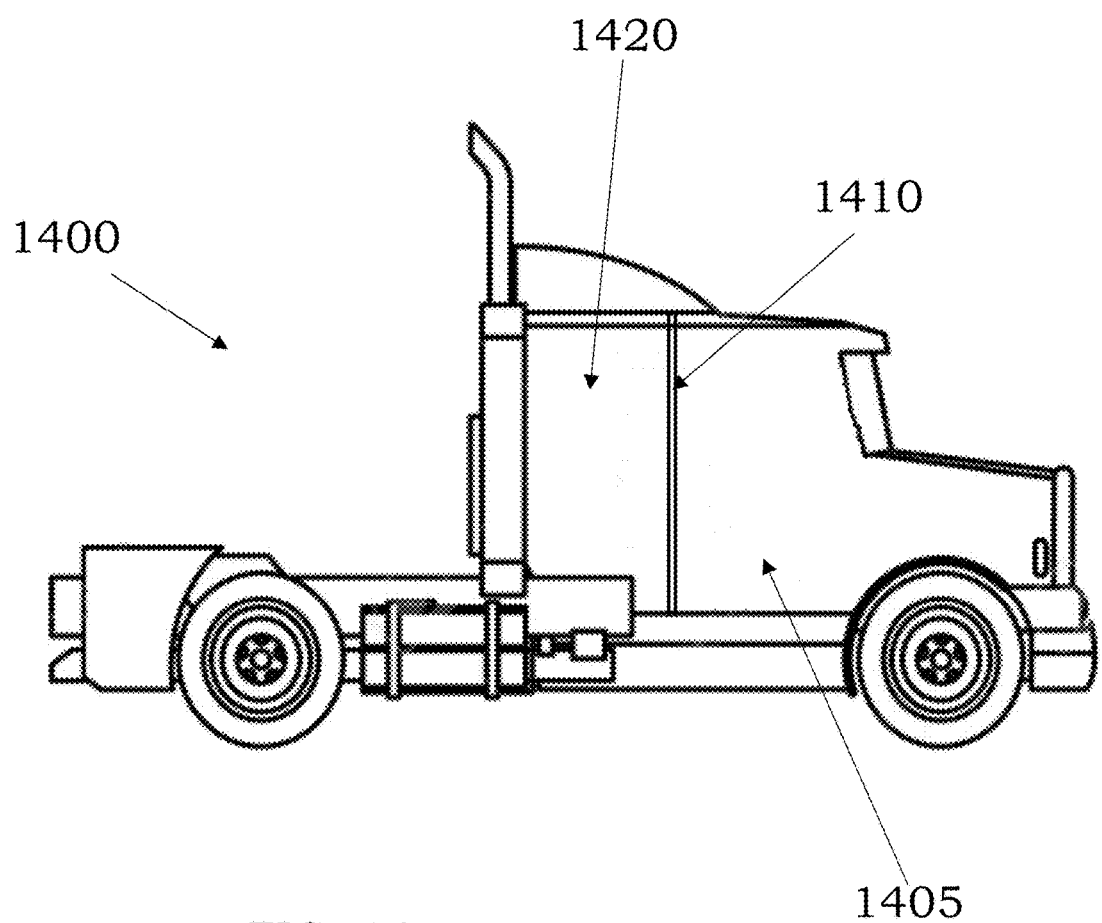
FIG. 14 is an illustration of a truck comprising a bulk head wall, in accordance with some examples.

In other embodiments, the multilayer assemblies described herein can be present in a bulk head wall. For example, a bulk head wall configured to separate a passenger compartment of a vehicle from a cargo compartment of the vehicle may include one or more of the multilayer assemblies descried herein. The bulk head wall may comprise a core layer and a first porous fiber reinforced thermoplastic layer disposed on the first surface of core layer, wherein the first porous fiber reinforced thermoplastic layer is bonded to surfaces of a plurality of first depressions across a first surface of the core layer. An illustration is shown in FIG. 14 where a bulk head wall 1410 is shown as separating a passenger compartment 1405 and a sleeping area 1420 in a truck cab 1400. Bulk head walls comprising the multilayer assemblies described herein may also be present in passenger vehicles, recreational vehicles, trains, subways, ships, planes, etc.

In certain embodiments, the multilayer assemblies may comprise more than a single core or honeycomb layer. For example, one, two, three or more honeycomb layers can be present in any one multilayer assembly as desired. The honeycomb layers can be positioned adjacent to each other or separated by one or more other layers. The honeycomb layers described herein can be produced with dimples or depressions prior to coupling to other layers or after coupling to other layers.

It will be recognized by the skilled person, given the benefit of this disclosure, that structures other than dimples or depressions could be provided in a similar manner. For example, a channel, slot or other structures could also be produced using methods and materials similar to those described herein.

When introducing elements of the examples disclosed herein, the articles "a," "an," "the" and "said" are intended to mean that there are one or more of the elements. The terms "comprising," "including" "with" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A method comprising:
disposing a first porous fiber reinforced thermoplastic layer on a first surface of a core layer to form a multilayer assembly, wherein the first porous fiber reinforced thermoplastic layer comprises a web of open celled structures formed by a plurality of reinforcing materials held together with a thermoplastic material; and
applying a first stimulus to a first surface of the multilayer assembly to provide a plurality of first depressions in the core layer and across the first surface of the multilayer assembly, wherein the applied first stimulus forces the first porous fiber reinforced thermoplastic layer into the plurality of first depressions in the core layer to enhance bonding between the first porous fiber reinforced thermoplastic layer and the core layer.

2. The method of claim 1, comprising applying the first stimulus to the first surface of the multilayer assembly by placing the multilayer assembly in a mold comprising a plurality of surface projections and molding the multilayer assembly using the mold.

3. The method of claim 1, comprising applying the first stimulus to the first surface of the multilayer assembly by pressing a plate comprising a plurality of surface projections into the first surface of the multilayer assembly.

4. The method of claim 1, comprising applying the first stimulus to the first surface of the multilayer assembly using a plurality of fluid jets positioned adjacent to the first surface of the multilayer assembly.

5. The method of claim 1, wherein the provided plurality of first depressions have different geometries.

6. The method of claim 1, further comprising applying a second stimulus to a second surface of the multilayer assembly to provide a plurality of second depressions in the core layer and across the second surface of the multilayer assembly, wherein the applied second stimulus forces the core layer into the first porous fiber reinforced thermoplastic layer to enhance bonding between the first porous fiber reinforced thermoplastic layer and the core layer.

7. The method of claim 6, comprising applying the first stimulus to the first surface of the multilayer assembly and applying the second stimulus to the second surface of the multilayer assembly by placing the multilayer assembly in a mold comprising a plurality of surface projections and molding the multilayer assembly using the mold.

8. The method of claim 6, comprising applying the second stimulus to the second surface of the multilayer assembly by pressing a plate comprising a plurality of surface projections into the second surface of the multilayer assembly.

9. The method of claim 6, comprising applying the second stimulus to the second surface of the multilayer assembly using a plurality of fluid jets positioned adjacent to the second surface of the multilayer assembly.

10. The method of claim 6, wherein the provided plurality of second depressions have different geometries.

11. The method of claim 1, wherein the plurality of first depressions have different depths.

12. The method of claim 1, further comprising disposing a first skin layer on the disposed first porous fiber reinforced thermoplastic layer prior to applying the first stimulus.

13. The method of claim 1, wherein the first porous fiber reinforced thermoplastic layer comprises an adhesive film.

14. The method of claim 1, comprising disposing a first skin layer on the multilayer assembly after applying the first stimulus.

15. The method of claim 1, wherein the core layer comprises a porous core layer and the first porous fiber reinforced thermoplastic layer comprises reinforcing fibers and a polyolefin thermoplastic material.

16. The method of claim 1, wherein the core layer comprises a honeycomb core layer.

17. The method of claim 16, wherein the reinforcing fibers comprise one or more of glass fibers, aramid fibers, graphite fibers, carbon fibers, inorganic mineral fibers, metal fibers, metalized synthetic fibers, and metallized inorganic fibers, fibers and combinations thereof.

18. The method of claim 16, wherein the thermoplastic material comprises one or more of polyethylene, polypropylene, polystyrene, acrylonitrylstyrene, butadiene, polyethyleneterephthalate, polybutyleneterephthalate, polybutylenetetrachlorate, polyvinyl chloride, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, a poly(1,4 phenylene) compound, silicones, or blends of these materials with each other.

19. The method of claim 16, wherein the honeycomb core layer is a paper honeycomb core layer, the reinforcing fibers comprise glass fibers and the thermoplastic material comprises a polyolefin.

20. The method of claim 1, further comprising:
disposing a second porous fiber reinforced thermoplastic layer on a second surface of the core layer to form the multilayer assembly, wherein the second porous fiber reinforced thermoplastic layer comprises a web of open celled structures formed by a plurality of reinforcing materials held together with a thermoplastic material, and
applying a second stimulus to the second surface of the multilayer assembly to provide a plurality of second depressions in the core layer and across the second surface of the multilayer assembly, wherein the applied second stimulus forces the second porous fiber reinforced thermoplastic layer into the plurality of second depressions in the core layer to enhance bonding between the second porous fiber reinforced thermoplastic layer and the core layer.

* * * * *